(12) United States Patent
Nakamura et al.

(10) Patent No.: US 8,169,707 B2
(45) Date of Patent: May 1, 2012

(54) SHEET-LIKE OPTICAL MEMBER, RESIN COMPOSITION FOR OPTICAL SHEET, OPTICAL SHEET AND METHOD FOR PRODUCING THE SAME

(75) Inventors: Runa Nakamura, Tokyo-to (JP); Naoyuki Mitsuyasu, Tokyo-to (JP); Satoko Maenishi, Tokyo-to (JP); Nobuaki Nakao, Kanagawa-ken (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 348 days.

(21) Appl. No.: 12/532,872

(22) PCT Filed: Mar. 27, 2008

(86) PCT No.: PCT/JP2008/055936
§ 371 (c)(1),
(2), (4) Date: Sep. 24, 2009

(87) PCT Pub. No.: WO2008/117854
PCT Pub. Date: Oct. 2, 2008

(65) Prior Publication Data
US 2010/0103529 A1    Apr. 29, 2010

(30) Foreign Application Priority Data

Mar. 27, 2007 (JP) ................. 2007-080759
Jul. 12, 2007 (JP) ................. 2007-183113

(51) Int. Cl.
*G02B 27/10* (2006.01)
*G03B 21/60* (2006.01)

(52) U.S. Cl. ................. 359/620; 359/454; 359/619

(58) Field of Classification Search .......... 359/618–621, 359/454–456, 443; 264/1.1, 1.32, 2.7
See application file for complete search history.

(56) References Cited

U.S. PATENT DOCUMENTS

2005/0148676 A1* 7/2005 Doi et al. ............... 520/1
2005/0225855 A1* 10/2005 Doi ....................... 359/457

FOREIGN PATENT DOCUMENTS

| JP | 11-500072 A | 1/1999 |
|----|-------------|--------|
| JP | 2000-239333 A | 9/2000 |
| JP | 2001-228549 A | 8/2001 |
| JP | 2002-105149 A | 4/2002 |
| JP | 2003-147209 A | 5/2003 |
| JP | 2003-313445 A | 11/2003 |
| JP | 2004-131520 A | 4/2004 |
| JP | 2005-263913 A | 9/2005 |
| JP | 2006-072346 A | 3/2006 |

OTHER PUBLICATIONS

International Search Report: PCT/JP2008/055936.

* cited by examiner

*Primary Examiner* — Dawayne A Pinkney
(74) *Attorney, Agent, or Firm* — Ladas & Parry LLP

(57) ABSTRACT

A sheet-like optical member being difficult to damage a shape of a lens part. The sheet-like optical member includes: a substrate; and a lens part, which is formed on the substrate, is made of an active energy ray-curable resin, and has a plurality of unit prisms. The maximum logarithmic attenuation rate $\Delta E$ of the lens part measured by a rigid body pendulum method is 0.4 or less.

14 Claims, 7 Drawing Sheets

SHEET-LIKE OPTICAL MEMBER, RESIN COMPOSITION FOR OPTICAL SHEET, OPTICAL SHEET AND METHOD FOR PRODUCING THE SAME

TECHNICAL FIELD

The present invention relates to a sheet-like optical member used as a prism sheet of a back light for a liquid crystal display device or the like, a resin composition for an optical sheet, an optical sheet and a method for producing the same. More specifically, the present invention relates to a resin composition for producing an optical sheet preferably used in a surface light source device for a back light that illuminates a translucent display body from backwards like a large area liquid crystal display device, advertisement board and the like, an optical sheet and a method for producing the same.

BACKGROUND ART

With a recent rapid development of a display technology of a liquid crystal display device or the like, demand for one having a novel function or higher quality is also becoming strong for a sheet-like optical member used therein. Examples of such sheet-like optical member include a prism sheet used for a back light of a liquid crystal display device or the like, a lenticular lens sheet used for stereograph, a projection screen or the like, and a Fresnel lens sheet used for a condenser lens of an overhead projector or the like. Such a sheet-like optical member usually has a substrate; and a lens part that is formed on the substrate and has unit prisms formed with a resin having the predetermined refractive index into a fine convexo-concave shape on a surface thereof.

The sheet-like optical member refracts light in the lens part to develop a predetermined function, and, in accordance with its application, a resin material constituting the lens part and a shape of the unit prism are determined. Accordingly, a shape of the unit prism is important from the viewpoint of developing a function of a sheet-like optical member. In the course of producing the sheet-like optical member, it has been necessary to give close attention so as to avoid collapse in a shape of the lens part or wear caused by friction. In this connection, as a material used in the lens part, a material that has high elastic modulus and is difficult to deform a shape of a formed unit prism has been used.

As a material used in the lens part, for example, urethane acrylates, each of which has a predetermined structure, are described in Patent Documents 1 to 3. Further, in Patent Document 4, unsaturated group-containing compounds having an S atom and two or more unsaturated groups, wherein a content of S atoms and a glass transition temperature in predetermined ranges are described. As the materials develop the elastic modulus to a certain extent by curing, they contribute to inhibit a shape of the lens part from being damaged.

However, with the foregoing rapid advancement of the display device, further improvements in the productivity and the like are demanded also for the sheet-like optical member. In this connection, a lens part formed from the foregoing material is still insufficient in the elastic modulus. Accordingly, when such a material is used, in order to inhibit the unit prism from deforming in the course of preparing a sheet-like optical member, a process consideration has to be paid so that excessive pressure may not be applied on the lens part or the lens part may not glaze with other member to be worn out.

From such restrictions in the process, the productivity of the sheet-like optical member has not been necessarily high.

Further, in recent years, display devices such as liquid crystal TVs, or electric advertisement panels are in a tendency to be larger in area. Therefore, research developments and material developments of accompanying associated parts have been actively forwarded. Such a display device has a surface light source device irradiating light from a rear side, and the surface light source device includes an optical sheet that refracts and transmits light from a light source toward a display panel. Also in the optical sheet, according to a tendency toward enlarging the area, for example, a wide and long optical sheet is produced and wound in a roll.

The optical sheet has a lens part formed by arranging a plurality of unit prisms, and is disposed on a light emitting surface of a display panel side in both of an edge light type surface light source device and a direct type surface light source device. An edge light type surface light source device is a device constituted such that source light is input from one side edge surface of a planar light guide body usually made of a transparent acryl resin or the like and light is output from an outputting surface that is one surface of the light guide body toward a back surface of a liquid crystal panel or the like. On the other hand, a direct type surface light source is a device constituted such that a liquid crystal panel and a reflective plate are disposed with a light source interposed therebetween, and, usually, light from a light source is reflected by a reflective plate toward a back surface of a liquid crystal panel or the like.

An optical sheet is produced as a wide and long sheet, and wound in a roll at the production. At that time, owing to its own weight of the roll, particularly at a winding core part, there is a problem that a pinnacle of a unit prism is "collapsed".

Furthermore, there is also a problem that, when a lens part provided to an optical sheet and a light guide body provided to surface light source device come into contact, a pinnacle of a unit prism is collapsed by heat added in the process. Moreover, there is another problem that a lens part and a light guide body come into contact to cause a crack of a pinnacle of a unit prism.

Problems of deformation or crack of a pinnacle of a unit prism generate display irregularities such as white spots (white pattern) on a display surface of a display device to deteriorate display performance. Therefore, a countermeasure thereof is in demand.

Patent Document 1: Japanese Patent Application Publication Laid-Open (JP-A) No. 2002-105149
Patent Document 2: JP-A No. 2004-131520
Patent Document 3: JP-A No. 2005-263913
Patent Document 4: JP-A No. 2006-72346
Patent Document 5: JP-A (Japanese Translation of PCT International Application) No. 11-500072

DISCLOSURE OF THE INVENTION

Problem to be Solved by the Invention

The present invention was carried out under the above-mentioned situations and intends to provide a sheet-like optical member that is difficult to damage a shape of a lens part and capable of producing at high productivity. Furthermore, the invention was carried out to solve the above-mentioned problem of deformation or crack of a pinnacle of the unit prism and intends to provide a resin composition for an optical sheet, which is preferably used in a surface light source device for a backlight that illuminates a translucent display body provided to a large area liquid crystal display device, advertisement board plate or the like, from a back surface thereof. A still another object of the invention is to provide an optical sheet made of such resin composition and a method for producing an optical sheet.

Means for Solving the Problems

In order to solve the problems, the present inventors studied intensively and came upon a following idea. That is, while the existing lens part is expected to be prepared with a hard material to prevent the lens part from deforming, the present inventors changed thinking in such a manner that, even when a lens part does not have enough hardness, when an original shape is restored after deformation, it results in that a shape of the lens part is not damaged. By materializing the idea, the invention came to completion.

That is, the present invention for solving the problems provides a sheet-like optical member comprising: a substrate and a lens part, which is formed on the substrate, is made of an active energy ray-curable resin, and has a plurality of unit prisms, wherein the maximum logarithmic attenuation rate ΔE of the lens part measured by a rigid body pendulum method is 0.4 or less.

According to the invention, the maximum logarithmic attenuation rate ΔE of the lens part measured by a rigid body pendulum method is 0.4 or less. Accordingly, even in the case when a unit prism attached onto a surface of the lens part is deformed by some sort of external reasons, the unit prism is capable of restoring an original shape so that it may maintain a desired shape. As the result, according to the invention, a sheet-like optical member difficult to damage a shape of the unit prism of the lens part may be obtained.

Further, in the invention, even when the lens part is deformed, an original shape may be restored. Accordingly, in the course of producing the sheet-like optical member of the invention, a countermeasure for preventing the unit prism from deforming becomes unnecessary. As the result, restrictions in the course of production are diminished, whereby productivity of the sheet-like optical members of the invention may be made higher.

From the reasons like these, the present invention may provide a sheet-like optical member that is difficult to damage a shape of a lens part and capable of producing at high productivity.

In the invention, the maximum temperature of a logarithmic attenuation rate of the lens part measured by a rigid body pendulum method is preferred to be 60° C. or more. Thereby, the sheet-like optical member of the invention is made difficult to deform a shape of the unit prism and excellent in the endurance.

In order to solve the problems, the invention provides a sheet-like optical member comprising: a substrate; and a lens part, which is formed on the substrate, is made of an active energy ray-curable resin, and has a plurality of unit prisms, wherein a tangent of the loss elastic modulus and storage elastic modulus (tan θ=loss elastic modulus/storage elastic modulus) of the active energy ray-curable resin is 0.2 or less in a temperature range from 0° C. to 200° C.

According to the invention, since a tangent of loss elastic modulus and storage elastic modulus (tan θ=loss elastic modulus/storage elastic modulus) of the active energy ray-curable resin is 0.2 or less in the range of temperature from 0 to 200° C., restorability of a shape may be imparted to the lens part. As the result, even in the case where a unit prism attached to a surface of the lens part is deformed owing to some sort of external factors, an original shape may be restored. Therefore, a desired shape may be maintained. Thereby, according to the invention, a sheet-like optical member that is difficult to damage a shape of the unit prism may be obtained.

Furthermore, even in the case where the unit prism is deformed, an original shape may be restored. Therefore, in the course of producing a sheet-like optical member of the invention, a countermeasure for preventing the unit prism from deforming becomes unnecessary. As the result, restrictions on a producing process may be diminished whereby productivity of sheet-like optical member of the invention may be made higher.

From the reasons like these, the present invention may provide a sheet-like optical member that is difficult to damage a shape of a lens part and capable of producing at high productivity.

In the invention, an equilibrium elastic modulus (160° C., 1 Hz) of an active energy ray-curable resin is preferred to be $1.0 \times 10^8$ Pa or more. Thereby, a lens part used in the invention may be made more excellent in the restorability of a shape.

Furthermore, in order to solve the problems, the invention provides a sheet-like optical member comprising: a substrate; and a lens part, which is formed on the substrate, is made of an active energy ray-curable resin, and has a plurality of unit prisms, wherein an elastic deformation rate of the active energy ray-curable resin is 40% or more at 25° C.

According to the invention, since an elastic deformation rate of the active energy ray-curable resin is 40% or more at 25° C., restorability of a shape may be imparted to the lens part. As the result, even in the case where a unit prism attached to a surface of the lens part is deformed owing to some sort of external factors, an original shape thereof may be restored. Therefore, a desired shape of a unit prism may be maintained. Thereby, in the invention, a sheet-like optical member that is difficult to damage a shape of the unit prism may be obtained.

Further, even in the case where the lens part is deformed like this, an original shape may be restored. Therefore, in the course of producing a sheet-like optical member of the invention, a countermeasure for preventing the unit prism from deforming becomes unnecessary. As the result, restrictions on a producing process may be diminished whereby productivity of sheet-like optical member of the invention may be made higher.

Accordingly, the present invention may provide a sheet-like optical member that is difficult to damage a shape of a lens part and capable of producing at high productivity.

In the invention, a refractive index of the lens part is preferred to be 1.5 or more. When the refractive index of the lens part is set at 1.5 or more, for example, in the case where a sheet-like optical member of the invention is used as a prism sheet of a backlight for a liquid crystal display device, a shape of the unit prism may be readily controlled so that a viewing angle and brightness of a liquid crystal display device may be combined.

The inventors studied intensively about an optical sheet and a resin composition for the optical sheet to solve problems such as deformation or crack of a pinnacle of a unit prism, and found in the course thereof that when an optical sheet is produced with a resin composition having specified resin properties the problems may be solved. Thereby, a resin composition for an optical sheet of the invention, an optical sheet and a method for producing the same were completed.

That is, an optical sheet of the invention for solving the problems is an optical sheet comprising: a transparent sheet; and a lens part, which is made of a number of unit prisms, formed from an active energy ray-curable resin, and formed on the transparent substrate, wherein, in the lens part, a difference between an overall transmittance after a load of 26 kg/cm² is applied to a pinnacle of the unit prism for 24 hours under an environment of 40° C. and an overall transmittance before the load is applied is set at 10% or le According to the invention, a lens part where a difference between overall transmittance after a load of 26 kg/cm² is applied to a pinnacle of the lens part for 24 hours under an environment of 40° C. and overall transmittance before the load is applied is set at 10% or less is provided. Therefore, in the lens part like this, a pinnacle of a unit prism does not collapse owing to its own weight of a roll even when the lens part is wound in a roll as a wide and long sheet. Furthermore, even when a lens part and a light guide body provided to a surface light source device come into contact, heat added in the process or the like does not collapse a pinnacle of a unit prism. Still furthermore, a pinnacle of a unit prism is not cracked when a lens part and a light guide body come into contact. Thereby, according to the invention, since a lens part does not have a problem such as so-called "collapse of pinnacle", without generating display irregularity such as white spots (white pattern) on a display surface of a display device, an optical sheet capable of imparting stable and excellent display performance may be provided.

An optical sheet of the invention is preferably constituted such that: Tg of the lens part measured with a rigid body pendulum may be 80° C. or more and 160° C. or less, Tg (1 Hz) of the lens part measured by a dynamic viscoelastic measurement may be 80° C. or more and 160° C. or less, and an equilibrium elastic modulus (160° C., 1 Hz) of the lens part measured by a dynamic viscoelastic measurement may be $3 \times 10^7$ Pa or more and $1 \times 10^8$ Pa or less.

In an optical sheet of the invention, a refractive index of the lens part is preferably 1.555 or more and 1.600 or less.

A resin composition for an optical sheet of the invention, which solves the foregoing problems is a resin composition for an optical sheet for forming a lens part made of a number of unit prisms provided to the optical sheet, wherein a cured material of the resin composition has a difference of 10% or less between an overall transmittance after a load of 26 kg/cm² is applied for 24 hours under an environment of 40° C. and an overall transmittance before applying a load.

According to the invention, in a cured material of the resin composition, a difference between an overall transmittance after a load of 26 kg/cm² is applied for 24 hours under an environment of 40° C. and an overall transmittance before applying a load is 10% or less. Accordingly, when the resin composition is used for an optical sheet, an optical sheet that does not cause a problem of so-called "collapse of pinnacle" or the like may be obtained.

In the resin composition for an optical sheet of the invention, a refractive index of the cured resin composition is preferably 1.555 or more and 1.600 or less.

In the resin composition for an optical sheet of the invention, the resin composition is preferably constituted by comprising: bisphenol A epoxy (meth)acrylate; urethane (meth)acrylate that is a reaction product of tolylenediisocyanate and/or xylylene diisocyanate, a diol compound represented by a formula (1), and OH-containing (meth)acrylate represented by a formula (2); one kind or two or more kinds of monofunctional monomer selected from a phenoxyethyl (meth)acrylate derivative represented by a formula (3), acryloylmorpholine, isobornyl (meth)acrylate and benzyl (meth)acrylate, one kind or two or more kinds of polyfunctional monomer selected from an isocyanulate (meth)acrylate derivative represented by a formula (4), dipentaerythritol hexa(meth)acrylate, trimethylolpropane tri(meth)acrylate, glycerin tri(meth)acrylate and pentaerythritol tri(meth)acrylate; and a photoinitiator.

[Chemical Formula 1]

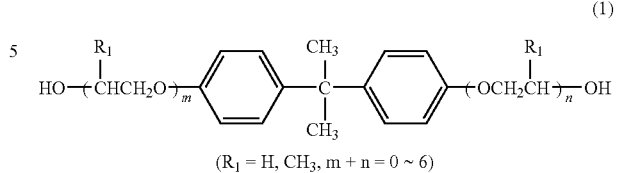

($R_1$ = H, $CH_3$, m + n = 0 ~ 6)

[Chemical Formula 2]

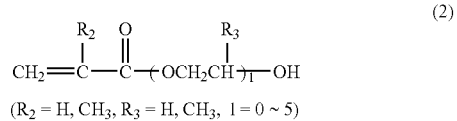

($R_2$ = H, $CH_3$, $R_3$ = H, $CH_3$, l = 0 ~ 5)

[Chemical Formula 3]

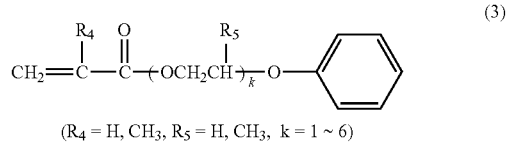

($R_4$ = H, $CH_3$, $R_5$ = H, $CH_3$, k = 1 ~ 6)

[Chemical Formula 4]

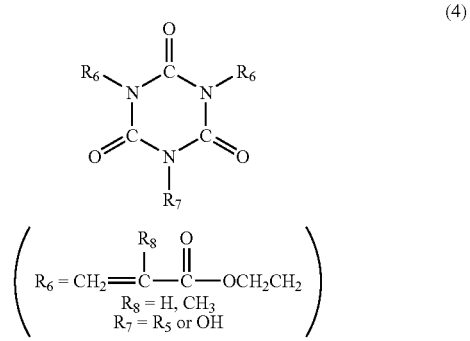

A method for producing an optical sheet of the invention, which solves the problems, is a method for producing an optical sheet having a lens part which has a number of unit prisms on a transparent substrate, comprising at least a step for: forming a lens part, wherein an active energy ray is irradiated after a resin composition for an optical sheet of the invention is coated on a shaping mold to form the lens part.

According to the invention, an optical sheet that does not cause a problem such as so-called "collapse of a pinnacle" or the like may be produced. In particular, the lens part formed according to the lens part forming step is constituted such that: Tg measured with a rigid body pendulum may be 80° C. or more and 160° C. or less, Tg (1 Hz) measured by a dynamic viscoelastic measurement may be 80° C. or more and 160° C. or less, and an equilibrium elastic modulus (160° C., 1 Hz) measured by a dynamic viscoelastic measurement may be $3 \times 10^7$ Pa or more and $1 \times 10^8$ Pa or less.

EFFECT OF THE INVENTION

A sheet-like optical member of the invention is advantageous in that a shape of a lens part is difficult to damage and a production may be realized at high productivity.

Further, according to the invention, a problem such as so-called "collapse of a pinnacle" is not generated. Therefore, without generating display irregularity such as white spots (white pattern) on a display surface of a display device, an optical sheet that may impart stable and excellent display performance may be provided. As the result, an optical sheet of the invention and an optical sheet produced according to the invention may be preferably used as an optical sheet constituting a surface light source device for, in particular, recent high quality and large area liquid crystal display device.

BRIEF DESCRIPTION OF THE DRAWINGS

FIG. 6A showing another example of the surface light source device shown in FIG. 4; and FIG. 6B showing another example of the surface light source device shown in FIG. 5.

REFERENCE NUMERALS

| 1: | substrate |
|---|---|
| 2: | lens part |
| 2': | lens part forming composition |
| 3: | sheet-like optical member |
| 4: | lens shaping mold |
| a: | unit prism |
| 10: | optical sheet |
| 12: | transparent substrate |
| 14: | unit prism |
| 16: | lens part |
| 18: | light diffusion layer |
| 30, 30', 40, 40': | surface light source device |
| 31: | adhesive layer |
| 32: | light guide body |
| 32A: | side edge surface |
| 32B: | light emitting surface |
| 34: | light source |
| 36, 44: | light reflective plate |
| 50: | liquid crystal display device |
| 52: | liquid crystal panel |
| S1: | one surface of transparent substrate |
| S2: | the other surface of transparent substrate |

BEST MODE FOR CARRYING OUT THE INVENTION

The respective inventions according to the present application will be sequentially described below.

A. Sheet-like Optical Member

In the beginning, a sheet-like optical member of the invention will be described. As described above, the sheet-like optical member of the invention comprises: a substrate; and a lens part, which is formed on the substrate, is made of an active energy ray-curable resin, and has a plurality of unit prisms, characterized in that the lens part or the active energy ray-curable resin has specified properties.

Figure 1:
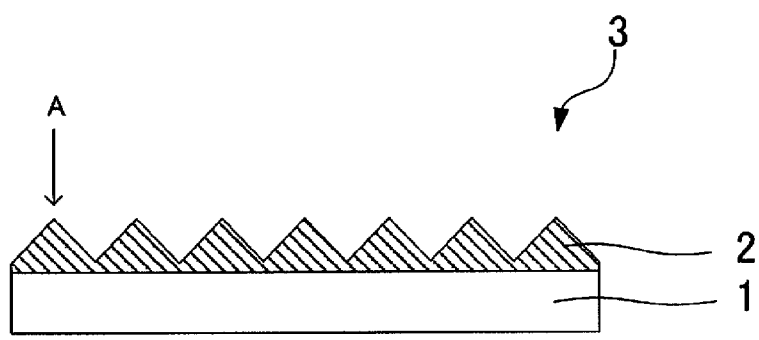
FIG. 1 is a schematic diagram showing one example of a sheet-like optical member of the invention.

Such sheet-like optical member of the invention will be described with reference to the drawings. FIG. 1 is a schematic diagram showing one example of the sheet-like optical member of the invention. As exemplified in FIG. 1, a sheet-like optical member 3 of the invention comprises a substrate 1 and a lens part 2 formed on the substrate 1.

The lens part 2 is made of an active energy ray-curable resin and has a plurality of unit prisms A.

In such example, the sheet-like optical member 3 of the invention comprises the lens part 2 or the active energy ray-curable resin contained in the lens part 2, which has predetermined properties. Therefore, even when the unit prism A is deformed, the sheet-like optical member 3 has restorability capable of restoring the unit prism A to an original shape.

According to the invention, the lens part or the active energy ray-curable resin has predetermined properties specified by the invention. Accordingly, even when a shape of a prism attached to a surface of the lens part is deformed by some external factors, an original shape may be restored whereby a desired shape of the unit prism may be maintained. As the result, according to the invention, a sheet-like optical member which is difficult to damage a surface shape of the unit prism may be obtained.

Furthermore, even when the unit prism is deformed like this, an original shape may be restored. Therefore, in the course of producing the sheet-like optical member of the invention, a countermeasure for preventing the unit prism from deforming becomes unnecessary. As the result, restrictions in the process of production are diminished, whereby productivity of the sheet-like optical members of the invention is made higher.

The sheet-like optical member of the invention comprises at least a substrate and a lens part, and, as required, may have other configurations.

The respective configurations used in the invention will be described below.

The sheet-like optical member of the invention may be roughly categorized into three aspects depending on an aspect of a lens part. Accordingly, a lens part will be described below dividing into three aspects, and other configurations will be described as a whole because these are common to all aspects.

1. Lens Part

Firstly, a lens part used in the invention will be described. The lens part used in the invention is made of an active energy ray-curable resin and has a plurality of unit prisms.

The lens part used in the invention can be divided into three aspects depending on difference in properties provided to develop the restorability of a shape of the unit prism. Accordingly, for every aspect, the lens part used in the invention will be described below.

(1) Lens Part of First Aspect

In the beginning, a lens part of the first aspect of the invention will be described. The lens part of the present aspect is characterized in that at least the maximum logarithmic attenuation rate $\Delta E$ measured by a rigid body pendulum method $\Delta E$ is 0.4 or less.

(A sheet-like optical member comprising a lens part of the present aspect is referred below to as "sheet-like optical member of first aspect" in some cases).

(Lens Part)

A lens part of the aspect is characterized in that at least the maximum logarithmic attenuation rate $\Delta E$ measured by a rigid body pendulum method is 0.4 or less. The reason why the maximum logarithmic attenuation rate $\Delta E$ is set at 0.4 or less in the lens part of the aspect is that, when the maximum logarithmic attenuation rate ΔE exceeds the foregoing range, the equilibrium elastic modulus of the lens part of the aspect becomes too small to impart sufficient shape restorability. A value of the maximum logarithmic attenuation rate ΔE of the lens part of the aspect is not particularly restricted as long as it is 0.4 or less. However, the value of the maximum logarithmic attenuation rate ΔE is preferably in the range of 0.1 to 0.4, and more preferably in the range of 0.2 to 0.3.

Further, in the lens part of the aspect, the maximum temperature of the logarithmic attenuation rate measured by a rigid body pendulum method is preferably 60° C. or more, and more preferably in the range of 80° C. to 150° C. When the maximum temperature is set in the range, a sheet-like optical member of the first aspect in which the lens part of the aspect is used may be made difficult to deform a shape of a unit prism and excellent in endurance.

The maximum logarithmic attenuation rate ΔE and the maximum temperature of the logarithmic attenuation rate, respectively, are measured by a rigid body pendulum method. The rigid body pendulum method is a method where, with a rigid body pendulum, an attenuation process of a vibration of the pendulum is analyzed to evaluate surface properties or the like of a solid. The maximum logarithmic attenuation rate ΔE and the maximum temperature of the logarithmic attenuation rate in the aspect mean values measured by a measurement method such as shown below.

That is, the maximum attenuation rate and the maximum temperature, respectively, mean the maximum attenuation rate and the maximum temperature obtained when a pipe-edge rigid body pendulum is vibrated with a fulcrum set at a contact point with the lens part, followed by heating at 3° C./minute up to 30° C. to 150° C.

Further, the lens part of the aspect has a glass transition temperature preferably of 70° C. or more, and more preferably in the range of 80° C. to 150° C. This is because when the glass transition temperature is in the range, even when a sheet-like optical member of the invention is wound long at production thereof, a shape of the lens part may be maintained.

The glass transition temperature means a temperature where a tangent of loss elastic modulus and storage elastic modulus (tan θ=loss elastic modulus/storage elastic modulus) shows a maximum value, when, by use of a dynamic viscoelastometer a temperature, is elevated at 3° C./minute from 0° C. to 200° C. while vibrating at 1 Hz.

A lens of the aspect, when provided with desired refractive index, may develop a specified function in combination with a shape of a unit prism. Accordingly, the refractive index of the lens part of the aspect is not particularly restricted as long as it is in the range that may develop a desired function in accordance with an application of the sheet-like optical member of the first aspect of the invention and in the relationship with the shape of the unit prism. In particular, in the aspect, usually, the refractive index is preferably 1.50 or more, more preferably in the range of 1.50 to 1.70, and still more preferably in the range of 1.53 to 1.57. This is because when the refractive index of the lens part is in the foregoing range, for example, in the case where the sheet-like optical member of the first aspect of the invention is used as a prism sheet of a backlight for a liquid crystal display device, the shape of the unit prism is readily controlled so that a viewing angle and brightness of the liquid crystal display device may be combined.

The lens part of the aspect has a plurality of unit prisms. An aspect of the unit prism like this may be appropriately determined in accordance with an application of the sheet-like optical member where the lens part of the aspect is used.

(Active Energy Ray-curable Resin)

In the next place, an active energy ray-curable resin used in a lens part of the aspect will be described. The active energy ray-curable resin used in the aspect is not particularly restricted as long as the maximum logarithmic attenuation rate ΔE of at least a lens part may be in the range specified by the present aspect.

In the aspect, in order to set the maximum logarithmic attenuation rate ΔE of the lens part within the range, a plurality of active energy ray-curable resins may be used or only one kind of active energy ray-curable resin may be used.

In the active energy ray-curable resin used in the aspect, a tangent of the loss elastic modulus and the storage elastic modulus (tan θ=loss elastic modulus/storage elastic modulus) is, in a temperature range from 0° C. to 200° C., preferably 0.2 or less, more preferably in the range of 0.1 to 0.2, and still more preferably in the range of 0.15 to 0.2. This is because when an active energy ray-curable resin having a tangent of the loss elastic modulus and the storage elastic modulus (tan θ=loss elastic modulus/storage elastic modulus) in the foregoing range is used, the lens part of the aspect may be made more excellent in the restorability of a shape.

In the active energy ray-curable resin used in the aspect, the equilibrium elastic modulus (160° C., 1 Hz) is preferably $1.0 \times 10^8$ Pa or more, more preferably in the range of $1.0 \times 10^8$ Pa to $6.0 \times 10^8$ Pa, and still more preferably in the range of $2.0 \times 10^8$ Pa to $4.0 \times 10^8$ Pa. This is because when the equilibrium elastic modulus (160° C., 1 Hz) of the active energy ray-curable resin used in the aspect is in the foregoing range, the lens part of the aspect may be made more excellent in the restorability of a shape.

The tangent of the loss elastic modulus and the storage elastic modulus (tan θ=loss elastic modulus/storage elastic modulus) and the equilibrium elastic modulus (160° C., 1 Hz) may be measured by a dynamic viscoelastic measurement. The tangent of the loss elastic modulus and the storage elastic modulus (tan θ=loss elastic modulus/storage elastic modulus) and the equilibrium elastic modulus (160° C., 1 Hz) in the aspect, respectively, use values measured by following measurement methods.

That is, the tan θ means a tan θ temperature when a tan θ shows a maximum value when, by use of a dynamic viscoelastometer, a temperature is elevated at 3° C./minute from 0° C. to 200° C. while vibrating at 1 Hz. Further, a value of the storage elastic modulus at 160° C. in the same evaluation is referred to as an equilibrium elastic modulus.

In the active energy ray-curable resin used in the aspect, an elastic deformation rate at 25° C. is preferably 40% or more, more preferably in the range of 40% to 70%, and still more preferably in the range of 45% to 55%. This is because when the elastic deformation rate of the active energy ray-curable resin used in the aspect is in the range, the lens part of the aspect is made more excellent in the restorability of a shape.

As the elastic deformation rate in the aspect, a value measured by a measurement method such as shown below is used.

That is, an active energy ray-curable resin is coated on a glass substrate of 15 cm×15 cm so that a thickness of a coated film may become about 150 μm, followed by irradiating UV-rays of about 780 mJ/cm² to the active energy ray-curable resin. This is taken as a sample for evaluating an elastic deformation rate. In the evaluation, with MK320 as an indenter, an ultrafine hardness testing machine (unit name: FISCHER SCOPE H-100™, manufactured by Fischer Instruments K.K.) is used to evaluate properties of a coated film. An evaluation temperature range is set from 30 to 60° C., an evaluation program is 300 mN (20 seconds)→creep 1 (60 seconds)→0.4 mN (4 seconds)→creep 2 (60 seconds) (144 seconds in total). Measurement conditions at this time are set as follows.

Measurement unit: HU-100™ (manufactured by Fischer Instruments K.K.)

Analysis soft: WIN-HCU™ (manufactured by Fischer Instruments K.K.)

Elastic deformation rate: work volume of elastic deformation/total (work volume of elastic deformation+work volume of plastic deformation)

Creep deformation rate 1: creep deformation rate under maximum load of 300 mN

Creep deformation rate 2: creep deformation rate under minimum load of 0.4 mN

From results evaluated by such method, elastic deformation rates, creep deformation rate, creep deformation rate 2, maximum push-in depths (μm) and push-in depths (μm) after tests are calculated at the respective temperatures by use of an analysis soft.

The active energy ray-curable resin used in the aspect has the creep deformation rate 1 in the creep 1 preferably in the range of 0 to 30%, more preferably in the range of 0 to 20%, and still more preferably in the range of 0 to 15%.

The active energy ray-curable resin used in the aspect has the creep deformation rate 2 in the creep 2 preferably in the range of 35 to 100%, more preferably in the range of 40 to 100%, and still more preferably in the range of 50 to 100%.

Examples of the active energy ray-curable resin like this include a photocurable resin that is cured by irradiating light and an electron beam-curable resin that is cured by irradiating an electron beam. However, in the invention, the photocurable resin is preferably used from the viewpoint of simplifying an irradiating device of an active energy ray.

The photocurable resin used in the invention is not particularly restricted as long as it is cured by irradiating light having a predetermined wavelength. Among these, the photocurable resin used in the invention has a wavelength of curing light preferably in the range of 200 to 600 nm, more preferably in the range of 250 to 500 nm, and still more preferably in the range of 280 to 440 nm.

As such photocurable resin, for example, those obtained by appropriately mixing a reactive prepolymer and a monomer component may be used. Examples of the reactive prepolymer include epoxy (meth)acrylate, urethane (meth)acrylate and polyester (meth)acrylate. Examples of the monomer component include: as monofunctional monomer, vinyl monomer such as N-vinyl pyrrolidone, N-vinyl caprolactone, vinyl imidazole, vinyl pyridine, or styrene, (meth)acrylic acid ester monomer such as phenoxyethyl (meth)acrylate, lauryl (meth)acrylate, stearyl (meth)acrylate, butoxyethyl (meth)acrylate, ethoxydiethylene glycol (meth)acrylate, methoxytriethylene glycol (meth)acrylate, methoxypolyethylene glycol (meth)acrylate, methoxydipropylene glycol (meth)acrylate, paracumylphenoxyethyl (meth)acrylate, nonylphenoxypolyethylene glycol (meth)acrylate, tetrahydrofurfuryl (meth)acrylate, isobornyl (meth)acrylate, cyclohexyl (meth)acrylate, benzyl (meth)acrylate, orthophenylphenoxyethyl (meth)acrylate, N,N-dimethyl (meth)acrylamide, N,N-dimethylaminopropyl (meth)acrylate, or acryloyl morpholine, and (meth)acrylamide derivatives; and as polyfunctional monomer components, ethylene glycol di(meth)acrylate, diethylene glycol di(meth)acrylate, triethylene glycol di(meth)acrylate, polyethylene glycol di(meth)acrylate, tripropylene glycol di(meth)acrylate, polytetramethylene glycol di(meth)acrylate, 1,4-butanediol di(meth)acrylate, 1,6-hexanediol di(meth)acrylate, 1,9-nonanediol di(meth)acrylate, 3-methyl-1,5-pentanediol di(meth)acrylate, neopentyl glycol di(meth)acrylate, dimethylol-tricyclodecane di(meth)acrylate, hydroxypivalic acid neopentyl glycol di(meth)acrylate, bisphenol A polyethoxydiol di(meth)acrylate, bisphenol A polypropoxydiol di(meth)acrylate, trimethylolpropane tri(meth)acrylate, ethoxylated trimethylolpropane tri(meth)acrylate, propoxylated trimethylolpropane tri(meth)acrylate, pentaerythritol tri(meth)acrylate, glyceryl tri(meth)acrylate, propoxylated glyceryl tri(meth)acrylate, tris(2-hydroxyethyl)isocyanurate tri(meth)acrylate, pentaerythritol tetra(meth)acrylate, ditrimethylolpropane tetra(meth)acrylate, dipentaerythritol penta(meth)acrylate, and dipentaerythritol hexa(meth)acrylate.

(Others)

The lens part of the aspect may include other additives than the active energy ray-curable resin. Other additives used in the aspect are not particularly restricted as long as each of these may impart a desired function to the lens part in accordance with an application or the like of a sheet-like optical member where the lens part of the aspect is used. In particular, examples of other additives preferably used in the aspect include silicone, an antioxidant, a polymerization inhibitor, a mold releaser, an antistatic agent, a UV stabilizer, a defoaming agent, a solvent, a non-reactive acrylic resin, a non-reactive urethane resin, a non-reactive polyester resin, a pigment, a dye, and a diffusion agent.

(2) Lens Part of Second Aspect

In the next place, a lens part of a second aspect used in the invention will be described. In the lens part of the aspect is characterized in that at least a tangent of the loss elastic modulus and the storage elastic modulus (tan θ=loss elastic modulus/storage elastic modulus) of an active energy ray-curable resin being used is 0.2 or less in a temperature range from 0° C. to 200° C.

(A sheet-like optical member having the lens part of the aspect is referred below to as "sheet-like optical member of second aspect" in some cases).

In the lens part of the aspect is characterized in that at least a tangent of the loss elastic modulus and the storage elastic modulus (tan θ=loss elastic modulus/storage elastic modulus) of the active energy ray-curable resin being used is 0.2 or less in a temperature range from 0° C. to 200° C. The reason why the tan θ in the lens part of the aspect is set at 0.2 or less in the foregoing temperature range is that when the tan θ is larger than the range, the elastic modulus of the lens part of the aspect becomes too low to impart sufficient shape restorability.

The tan θ of the active energy ray-curable resin used in the aspect is not particularly restricted as long as it is 0.2 or less in the temperature range from 0° C. to 200° C. However, the tan θ is more preferably in the range of 0.1 to 0.2, and particularly preferably in the range of 0.15 to 0.2.

In the active energy ray-curable resin used in the aspect, the equilibrium elastic modulus (160° C., 1 Hz) is preferably $1.0 \times 10^8$ Pa or more, more preferably in the range of $1.0 \times 10^8$ Pa to $6.0 \times 10^8$ Pa, and still more preferably in the range of $2.0 \times 10^8$ Pa to $4.0 \times 10^8$ Pa.

This is because when the equilibrium elastic modulus (160° C., 1 Hz) of the active energy ray-curable resin used in the aspect is in the foregoing range, the lens part of the aspect may be made more excellent in the shape restorability.

A method for measuring the tan θ and equilibrium elastic modulus (160° C., 1 Hz) of the aspect is same as that described in a section of the "(1) Lens part of first aspect". Therefore, descriptions thereof will be omitted herein.

Items concerning the active energy ray-curable resin used in the aspect other than the items described above are same as that described in the section of the "(1) Lens part of first aspect". Therefore, descriptions thereof will be omitted herein.

In the lens part of the aspect, the maximum logarithmic attenuation rate ΔE measured by a rigid body pendulum method is preferably 0.4 or less, more preferably in the range of 0.1 to 0.4, and particularly preferably in the range of 0.2 to 0.3. This is because when the maximum logarithmic attenuation rate ΔE is set in the range, the lens part of the aspect may be made more excellent in the shape restorability.

A method for measuring the maximum logarithmic attenuation rate ΔE in the aspect is same as that described in the section of the "(1) Lens part of first aspect". Therefore, descriptions thereof will be omitted herein.

In the lens part of the aspect, items other than that described above are common with a lens part of a first aspect. Accordingly, items concerning a lens part of the aspect other than that described above are same as that described in the section of the "(1) Lens part of first aspect". Therefore, descriptions thereof will be omitted herein.

(3) Lens Part of Third Aspect

Next, a lens part of a third aspect used in the invention will be described. A lens part of the aspect is characterized in that at least an elastic deformation rate of an active energy ray-curable resin being used is 40% or more at 25° C.

(A sheet-like optical member having a lens part of the aspect is referred below to as "sheet-like optical member of third aspect" in some cases).

The lens part of the aspect is characterized in that at least the elastic deformation rate of an active energy ray-curable resin being used is 40% or more at 25° C. The reason why the elastic deformation rate in the lens part of the aspect is set in the foregoing range is that when the elastic deformation rate is smaller than the range, the elastic modulus of the lens part of the aspect becomes too low to impart sufficient shape restorability to the lens part. The elastic deformation rate of the active energy ray-curable resin used in the aspect is not particularly restricted as long as it is in the range. However, the elastic deformation rate is preferably in the range of 40% to 70%, and particularly preferably in the range of 45% to 55%.

Items concerning the active energy ray-curable resin used in the aspect other than the items described above are same as that described in the section of the "(1) Lens part of first aspect". Therefore, descriptions thereof will be omitted herein.

In the lens part of the aspect, the maximum logarithmic attenuation rate ΔE measured by a rigid body pendulum method is preferably 0.4 or less, more preferably in the range of 0.1 to 0.4, and particularly preferably in the range of 0.2 to 0.3. This is because when the maximum logarithmic attenuation rate ΔE is in the foregoing range, the lens part of the aspect may be made more excellent in the shape restorability.

A method for measuring the maximum logarithmic attenuation rate ΔE in the aspect is same as that described in the section of the "(1) Lens part of first aspect". Therefore, descriptions thereof will be omitted herein.

In the lens part of the aspect, items other than that described above are common with the lens part of a first aspect. Accordingly, items concerning the lens part of the aspect other than that described above are same as that described in the section of the "(1) Lens part of first aspect". Therefore, descriptions thereof will be omitted herein.

2. Substrate

Then, a substrate used in a sheet-like optical member of the invention will be described. The substrate used in the invention supports the lens part.

The substrate used in the invention is not particularly restricted as long as it has desired light transmission properties and a substrate generally used in a sheet-like optical member may be used. Examples of such the substrate include glass, an acrylic resin, a polycarbonate resin, a vinyl chloride resin, a polymethacrylimide resin, a polyester resin, and a cyclic olefin copolymer such as a COP resin or a COC resin.

The substrate used in the invention may be subjected to, as required, antistatic treatment, antireflection treatment or the like.

The antistatic treatment and antireflection treatment may be applied according to generally known methods. Therefore, descriptions thereof will be omitted herein.

3. Optional Configuration

The sheet-like optical member of the invention has at least the lens part and substrate, and, as required, may use other optional configurations. As an optional configuration used in the invention, a configuration having a desired function may be appropriately selected and used in accordance with an application of the sheet-like optical member of the invention or the like. As such the optional configuration, for example, an adhesive layer that is formed between the substrate and the lens part to improve the adhesiveness between the lens part and the substrate, a matt coated layer formed on an opposite surface of the substrate from a surface on which the lens part is formed, an antistatic layer and a mold releasing layer are cited.

As to the matt coated layer used in the invention, a generally known matt coated layer such as described in, for example, JP-A Nos. 9-104554 and 9-192464 may be used.

4. Application of Sheet-like Optical Member

The sheet-like optical member of the invention may be used in, for example, a Fresnel lens sheet or lenticular sheet used in a projection screen of a projection TV or the like, and a prism sheet used in a backlight for a liquid crystal display device or the like. The sheet-like optical member of the invention may be used preferably in all of the applications and particularly preferably used as a prism sheet of a backlight for a liquid crystal display device.

5. Method for Producing Sheet-like Optical Member

A sheet-like optical member of the invention is not particularly restricted. As a method for producing an optical sheet, except that an active energy ray-curable resin capable of imparting desired properties to a lens part is used, a generally known method may be used. Herein, as a general method for producing an optical sheet, a batch production method and a continuous production method are known. As one example of a method for producing a sheet-like optical member of the invention, an example of a method that uses a batch production method will be described.

Figure 2A:
FIGS. 2A to 2E are a schematic diagram showing one example of a method for producing the sheet-like optical member of the invention.
Figure 2B:
Figure 2C:
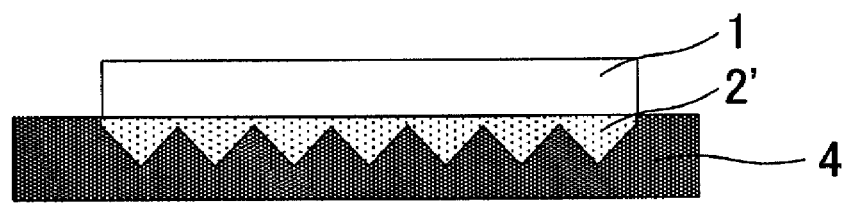
Figure 2D:
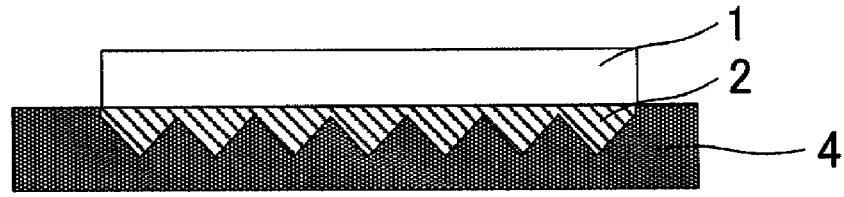
Figure 2E:
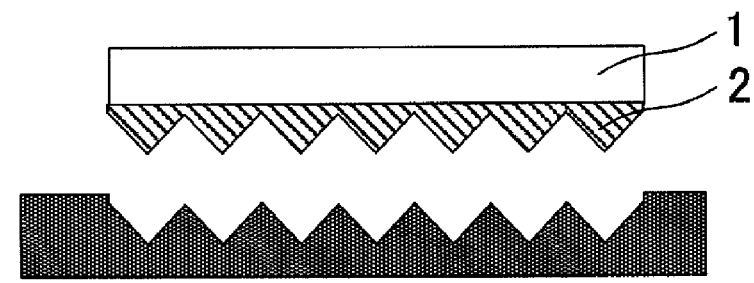

Firstly, a method for producing a sheet-like optical member of the invention according to the batch production method will be described with reference to the drawings. FIGS. 2A to 2E are a schematic diagram showing one example of a method for producing a sheet-like optical member of the invention. As exemplified in FIGS. 2A to 2E, a method for producing a sheet-like optical member of the invention, comprising the following step may be cited for example: a step of injecting, in which a lens mold 4 having a desired unit prism pattern formed is prepared (FIG. 2A) and a lens part forming composition 2' containing the above-mentioned active energy ray-curable resin is injected and developed in the lens mold 4 (FIG. 2B); a step of adhering a substrate, in which a substrate 1 is closely bonded to the lens mold 4 with the lens part forming composition 2' injected (FIG. 2C); a step of curing, in which an active energy ray is irradiated from the substrate 1 side to the lens part forming composition 2' to cure the lens part forming composition 2' (FIG. 2D); and a step of peeling a lens mold, in which the lens mold 4 is peeled (FIG. 2E).

Examples of the lens mold used in such a method include a metal mold made of aluminum, brass, steel or the like, a synthetic resin mold made of a silicone resin, a urethane resin, an epoxy resin, an ABS resin, a fluororesin, a polymethylpentene resin or the like, and a mold obtained by plating these molds or by mixing various kinds of metal powder.

Examples of a light source for illuminating an active energy ray in the curing step include a chemical lamp for chemical reaction, a low-pressure mercury lamp, a high-pressure mercury lamp, a metal halide lamp, and a visible halogen lamp.

B. Optical Sheet and Resin Composition for Optical Sheet

In the next place, an optical sheet and a resin composition for the optical sheet of the invention will be described.

Figure 3:
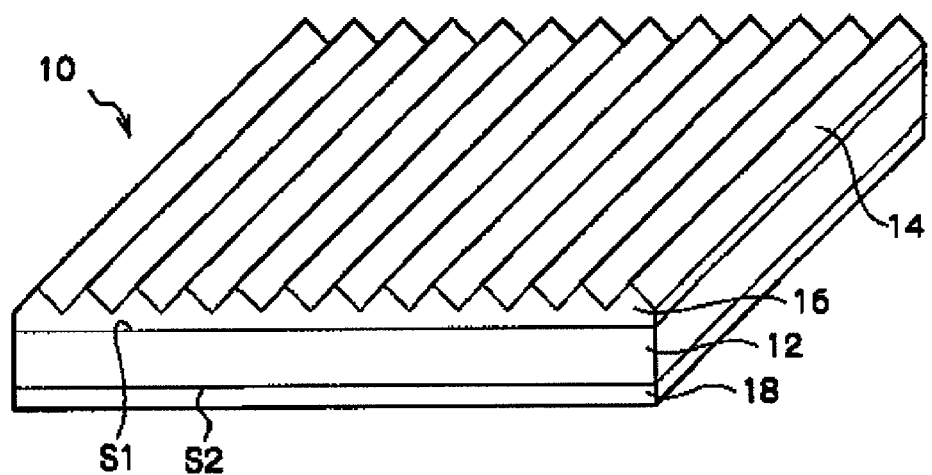
FIG. 3 is a perspective view schematically showing one example of an optical sheet of the invention.

Firstly, an optical sheet will be described. FIG. 3 is a perspective view schematically showing one example of an optical sheet of the invention. An optical sheet 10 of the invention comprises as shown in FIG. 3, a transparent substrate 12, and a lens part 16 formed on one surface S1 of the transparent substrate 12 and made of a number of unit prisms 14.

(Transparent Substrate)

The transparent substrate 12 is an essential constituent member of the optical sheet 10, works as a substrate of the lens part 16 described below and transmits much light from a light source to the lens part 16 side. The transparent substrate 12 has only to be a light-transmitting substrate made of a resin material and is particularly preferred to have transmittance of the substrate per se of 85% or more. The transmittance herein is a value measured by use of a haze meter (type name: HM-150™, manufactured by Murakami Color Research Laboratory Co., Ltd.).

A thickness of the substrate 12 is not particularly restricted. However, it is usually in the range of 50 to 500 μm that allows winding in a roll.

As the transparent substrate 12, transparent substrates constituted of, for example, a polyester resin such as polyethylene terephthalate, polybutylene terephthalate or polyethylene naphthalate, an acrylic resin such as polymethyl methacrylate, a thermoplastic resin such as a polycarbonate resin, a polystyrene resin, or polymethyl pentene resin, a resin obtained by curing with electromagnetic radiation such as UV-rays or an electron beam an ionizing radiation-curable resin made of an oligomer, such as polyester (meth)acrylate, urethane (meth)acrylate, or epoxy (meth)acrylate, and/or (meth)acrylate monomer may be preferably cited.

A transparent substrate 12 is preferably prepared by extruding or by coextruding together with a light diffusing layer 18 described below. The transparent substrate 12 may be produced according to a method other than that described above. The transparent substrate 12 prepared by extrusion or the transparent substrate 12 prepared according to a method other than the above is usually stretched. The stretching treatment may be either biaxial stretching or uniaxial stretching. However, biaxial stretching is usually preferably applied.

(Lens Part)

A lens part 16 is disposed on one surface S1 of the transparent substrate 12 and, as shown in FIG. 3, is a prism group where a number of unit prisms 14 showing a triangular prism shape are arranged so that ridge lines thereof may be arranged in parallel. The optical sheet 10 comprising the lens part 16 may be used in a single layer configuration. However, in order to control light diffusion angles in two directions (vertical direction, horizontal direction), two optical sheets 10 each of which has a lens part 16 may be laminated so that ridge lines thereof may be orthogonal to each other. In this case, when a direction of a lens surface is set in the same direction, light transmittance is highest and most excellent. However, the lens part 16 sides may be constituted so as to oppositely face each other. A thickness from a lens pinnacle to a plane portion of the lens part 16 is usually about from 20 to 1000 μm.

In the invention, in the lens part 16, a difference between an overall transmittance after a load of 26 kg/cm$^2$ is applied to a pinnacle of the unit prism 14 for 24 hours under an environment of 40° C. and an overall transmittance before the load is applied is set at 10% or less. The overall transmittance may be measured with a light transmittance meter as measured in an example described below.

The difference of the overall transmittances before and after a load is applied to a lens part 16 is set within the foregoing range. Therefore, there is an advantage that, even when an optical sheet 10 is wound as a wide and long sheet at production, a pinnacle of a unit prism 14 is not collapsed by its own weight and a collapsed state does not remain as it is. Furthermore, even when the lens part 16 and a light guide body 32 provided to a surface light source device described below come into contact, a pinnacle of a unit prism 14 is not collapsed by heat added in the process or the like and a collapsed state does not remain as it is. Still furthermore, even when the lens part 16 and the light guide body 32 of a surface light source device come into contact, the pinnacle of the unit prism 14 is not cracked. As the result, when an optical sheet 10 comprising the lens part 16 having the above-mentioned features is used, a problem of so-called "collapse of pinnacle" or the like is not generated in the lens part 16, whereby, without causing display irregularity such as white spots (white pattern) on a display surface of a display device, an optical sheet capable of imparting stable and excellent display performance may be provided. The difference of the overall transmittances before and after a load is applied to the lens part 16 is more preferably 5% or less. In the range, the optical sheet may be wound longer. Therefore, production is advantageously conducted in a large roll.

On the other hand, when the difference of the overall transmittances before and after a load is applied to the lens part 16 exceeds 10%, a problem of the so-called "collapse of pinnacle" remains same as ever. Therefore, display irregularities such as white spots (white pattern) or the like are generated, for example, on a display surface of a display device.

In the invention, a load is set at 26 kg/cm$^2$ and applied from a pinnacle side of a unit prism 14 that the lens part 16 has. A mode of the load is not particularly restricted. However, as shown in an example described below, a load having a diameter of 2.5 mm and a weight of 1.276 kg is exemplified. In the invention, a test environment when a load is applied is set in a temperature-controlled room set at 40° C., a load is applied under the environment for 24 hours, and after that, the light transmittance of the optical sheet is measured.

Furthermore, in the invention, resin properties of the lens part 16 that is constituted such that the overall transmittances before and after the load is applied may be in the foregoing range is analyzed. As the result, as the resin properties of the lens part 16 satisfying the overall transmittance difference, it is found that: Tg measured with a rigid body pendulum is 80° C. or more and 160° C. or less, Tg (1 Hz) measured by a dynamic viscoelastic measurement is 80° C. or more and 160° C. or less, and the equilibrium elastic modulus (160° C., 1 Hz) measured by a dynamic viscoelastic measurement is $3 \times 10^7$ Pa or more and $1 \times 10^8$ Pa or less. A relationship that: a lens part 16 where the overall transmittances before and after a load is applied are in the foregoing range shows such resin properties, and by contrast, the lens part 16 showing such resin properties has the overall transmittances before and after a load is applied in the foregoing range is found.

The Tg measured with a rigid body pendulum is measured with a rigid body pendulum viscoelastometer capable of measuring a curing and drying behavior and properties of a material, and may be measured, for example, with a rigid body pendulum property tester shown in an example described below. In the rigid body pendulum property tester, an edge that a rigid body pendulum has is left at rest on pinnacles of a number of unit prisms 14 that the lens part 16 has, the pendulum is attracted by an electromagnet, followed by releasing a magnetic force to generate a pendulum motion, and, under the pendulum motion, against the edge, resistance caused by viscoelasticity of the lens part 16 (pinnacle of the unit prism 14) acts. The resistance action causes attenuation of the pendulum and a change in a period. When temperature dependency of the change is evaluated, the glass transition temperature Tg that is the resin properties of the lens part 16 (pinnacle of unit prism 14) may be evaluated.

In the invention, it is found that: when the glass transition temperature Tg of the lens part 16 (pinnacle of the unit prism 14) measured with a rigid body pendulum is in the range of 80° C. or more and 160° C. or less, the problems such as collapse of pinnacles are solved; on the other hand, when the Tg is less than 80° C., the problem of collapse of pinnacles or the like remains in some cases. Furthermore, the upper limit of Tg is set at 160° C. However, since the upper limit of a cured material made of a resin composition for an optical sheet usually used is conveniently set as the upper limit, when only the viewpoint of the collapse of pinnacles or the like is considered, a higher value such as about 180° C. may be acceptable.

The Tg measured by a dynamic viscoelasticity method is measured by use of a dynamic viscoelastometer shown in, for example, an example described below. By use of the dynamic viscoelastometer, storage elastic modulus (E') corresponding to elasticity, loss elastic modulus (E") corresponding to viscosity, and temperature dependence and frequency dependence of a loss tangent (tan δ) that is a ratio of E" and E' and reflects vibration absorptivity and the like may be measured. From the result of the measurement, the glass transition temperature Tg, equilibrium elastic modulus and the like caused by an intramolecular structure of a resin cured material that constitutes a lens part 16 (pinnacles of the unit prisms 14) may be evaluated. In the invention, a measurement is conducted with a tensile sine wave under a frequency of 1 Hz. A temperature showing the maximum value of the loss tangent (tan δ) is taken as a glass transition temperature (Tg) and the storage elastic modulus (E') at 160° C. is taken as the equilibrium elastic modulus.

In the invention, it is found that when the glass transition temperature Tg (1 Hz) of the lens part 16 (pinnacles of unit prisms 14) measured by the dynamic viscoelastic measurement is in the range of 80° C. or more and 160° C. or less, the problems of collapse of pinnacle or the like are solved. On the other hand, when the Tg (1 Hz) is less than 80° C., the problems of the collapse of pinnacles or the like remains in some cases. Further, herein, the upper limit of Tg (1 Hz) is set at 160° C. However, since the upper limit of a cured material made of a resin composition for an optical sheet usually used is conveniently set as the upper limit, when only the viewpoint of the collapse of pinnacles or the like is considered, a higher value such as about 180° C. may be acceptable. The Tg measured by the dynamic viscoelastic measurement and the Tg measured with the rigid body pendulum show substantially same results.

The equilibrium elastic modulus (160° C., 1 Hz) measured by the dynamic viscoelastic measurement corresponds to the above-mentioned storage elastic modulus (E') and may be measured simultaneously with the glass transition temperature Tg. In the invention, it is found that when a value thereof is in the range of $3 \times 10^7$ Pa or more and $1 \times 10^8$ Pa or less, the problems of collapse of pinnacles or the like are solved, and on the other hand, when the equilibrium elastic modulus (160° C., 1 Hz) is less than $3 \times 10^7$, the problems of collapse of pinnacles or the like remain in some cases.

The lens part 16 is formed from a resin composition for an optical sheet, in which conventionally known compounds are blended so that a cured material may show the foregoing resin properties. As such a resin composition for an optical sheet, various kinds may be exemplified. Examples thereof include transparent resins such as a homopolymer of (meth)acrylic acid ester such as: methyl poly(meth)acrylate, or butyl poly (meth)acrylate; or a copolymer of (meth)acrylic acid ester such as a copolymer of methyl (meth)acrylate-butyl (meth) acrylate (Herein, "(meth)acrylic acid" means acrylic acid or methacrylic acid.); polyester such as polyethylene terephthalate, or polybutylene terephthalate; a thermoplastic resin such as polycarbonate, polystyrene, or polymethyl pentene; or (meth)acrylate such as polyfunctional urethane (meth)acrylate, or polyester (meth)acrylate, or unsaturated polyesters, which are crosslinked by irradiating active energy ray such as UV-rays or an electron beam.

Among these, an active energy ray-curable resin composition constituted of epoxy (meth)acrylate, urethane (meth) acrylate, a monofunctional monomer, a polyfunctional monomer, and a photoinitiator is preferably used. In particular, an active energy ray-curable resin composition that comprises: bisphenol A epoxy (meth)acrylate; urethane (meth) acrylate that is a reaction product of tolylenediisocyanate and/or xylylene diisocyanate, a diol compound represented by a formula (1), and OH-containing (meth)acrylate represented by a formula (2); one kind or two or more kinds of monofunctional monomer selected from a phenoxyethyl (meth)acrylate derivative represented by a formula (3), acryloylmorpholine, isobornyl (meth)acrylate, and benzyl (meth) acrylate; one kind or two or more kinds of polyfunctional monomers selected from an isocyanulate (meth)acrylate derivative represented by a formula (4), dipentaerythritol hexa (meth)acrylate, trimethylolpropane tri(meth)acrylate, glycerin tri(meth)acrylate and pentaerythritol tri(meth)acrylate; and a photoinitiator is preferably used.

[Chemical Formula 5]

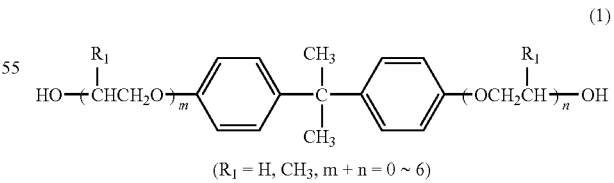

(1)

($R_1$ = H, $CH_3$, m + n = 0 ~ 6)

[Chemical Formula 6]

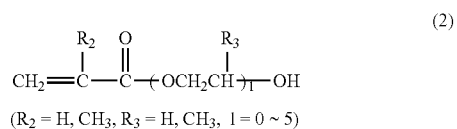

(2)

($R_2$ = H, $CH_3$, $R_3$ = H, $CH_3$, l = 0 ~ 5)

-continued

[Chemical Formula 7]

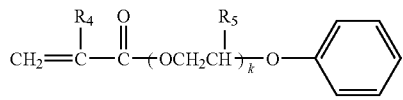
(3)

($R_4$ = H, $CH_3$, $R_5$ = H, $CH_3$, k = 1 ~ 6)

[Chemical Formula 8]

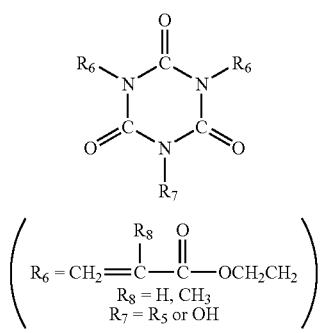
(4)

A blending ratio of constituent materials of the active energy ray-curable resin composition is preferably set at epoxy (meth)acrylate: 5 to 50 parts by weight, urethane (meth)acrylate: to 50 parts by weight, monofunctional monomer: 1 to 60 parts by weight, polyfunctional monomer: 5 to 30 parts by weight, and photoinitiator: 0.01 to 10 parts by weight, without restricting thereto.

In the resin composition of the invention, as an optional component, a compound (monomer component) containing a (meth)acryloyl group or a vinyl group other than the above-mentioned monofunctional monomer and polyfunctional monomer may be used. Since such monomer is same as the photocurable resin described in a section of the "A. Sheet-like optical member", descriptions thereof will be omitted herein.

Examples of the photoinitiator (photopolymerization initiator) used in the resin composition in the invention include: 1-hydroxycyclohexylphenyl ketone, 2-hydroxy-2-methyl-1-phenylpropane-1-one, 2,2-dimethoxy-1,2-diphenylethane-1-one, 1-[4-(2-hydroxyethoxy)-phenyl]-2-hydroxy-2-methyl-1-propane-1-one, 2-methyl-1-[4-(methylthio)phenyl]-2-morpholinopropane-1-one, 2-benzyl-2-dimethylamino-1-(4-morpholinophenyl)-butanone-1,2-hydroxy-2-methyl-1-phenyl-propane-1-ketone, 2,4,6-trimethylbenzoyldiphenylphosphine oxide, and phenyl bis(2,4,6-trimethylbenzoyl)-phosphine oxide. These may be used singularly or in a combination of two or more kinds thereof.

In the resin composition of the invention, other than the foregoing components, as required, silicone, an antioxidant, a polymerization inhibitor, a mold releaser, an antistatic agent, a UV stabilizer, a defoaming agent, a solvent, a non-reactive acrylic resin, a non-reactive urethane resin, a non-reactive polyester resin, a pigment, a dye, a diffusion agent, or the like may be also used together.

Such the resin composition preferably has the refractive index after the resin composition is cured of 1.555 or more. A cured material having the refractive index of 1.555 or more is preferably used as a lens part 16 having a unit prism 14. The upper limit of the refractive index is not particularly restricted. However, from the viewpoint of the cost, the refractive index is preferably 1.600 or less.

The lens part 16 is produced with the resin composition for an optical sheet by means of, for example, (1) a known hot press method (JP-A No. 56-157310), (2) a method where a shape of a unit prism 14 is embossed on a UV-curable thermoplastic resin film with an embossing roller, followed by irradiating UV-rays to cure the film (JP-A No. 61-156273), or (3) a method where an active energy ray-curable resin solution is coated on a rotating roll intaglio on which a shape of unit prism 14 is embossed to fill a recess, followed by irradiating an active energy ray such as UV-rays or an electron beam on a roll intaglio through a resin solution to cure with a film transparent substrate 12 coated, further followed by peeling these off the roll intaglio to form a shape of a unit prism 14 of a roll intaglio on a film transparent substrate 12 (JP-A No. 3-223883 and U.S. Pat. No. 4,576,850).

(Other Layers)

A light diffusion function may be imparted to an optical sheet 1. As a method for imparting the light diffusion function, as one example is shown in FIG. 3, a method where a light diffusion layer 18 is disposed or a so-called matt treatment is applied to at least one surface of a transparent substrate 12 is cited. As a method for imparting a light diffusion function, many methods have been proposed. Accordingly, herein, a description is limited to what is described below without further detailing.

A light diffusion layer 18 shown in FIG. 3 is a preferably disposed optional layer and may be formed into a general light diffusion layer as long as it has a light diffusion function. For example, a layer obtained by dispersing light diffusing microparticles in a transparent resin may be applied. The light diffusion layer 18 may be disposed either on the other surface S2 of the transparent substrate 12, or between one surface S1 of the transparent substrate 12 and a lens part 16 (not shown in the drawing), or in both thereof.

As the transparent resin material constituting the light diffusion layer 18, resin materials same as the transparent substrate 12 and transparent material such as acryl, polystyrene, polyester, or a vinyl polymer may be used. Furthermore in the light diffusion layer 18, light diffusing microparticles are uniformly dispersed. As the light diffusing microparticles, light diffusing microparticles generally used in an optical sheet are used. Examples thereof include methyl polymethacrylate (acryl) beads, butyl polymethacrylate beads, polycarbonate beads, polyurethane beads, calcium carbonate beads, and silica beads.

A variety of methods may be used to produce the light diffusion layer 18. For example, a paint in which light diffusing microparticles are dispersed in a translucent binder resin may be coated by a spray coating method, a roll coating method or the like, or alternatively, a resin material in which light diffusing microparticles are dispersed is prepared and the resin material may be co-extruded together with a extrusion material of a transparent substrate 12. A thickness of the light diffusion layer 18 is usually in the range of 1 to 20 μm.

Further, though not shown in the drawing, in a matt treatment, for example, in place of disposing a light diffusion layer 18 on the other surface S2 of the transparent substrate 12, predetermined surface roughness is imparted to the surface S2 to impart a light diffusion function. A method where a surface is mechanically roughened, a method where an irregular layer including particles is formed, or the like is cited.

(Surface Light Source Device)

Figure 4:
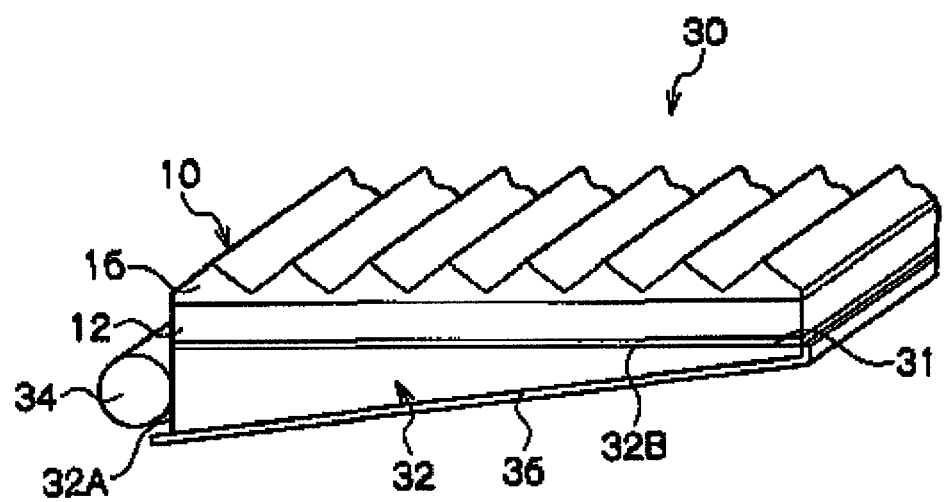
FIG. 4 is a perspective view schematically showing one example of a surface light source device which comprises the optical sheet of the invention.

FIG. 4 is a perspective view showing one example of a surface light source device comprising an optical sheet of the invention. The surface light source device 30 shown in FIG. 4 is a so-called edge light type surface light source device and comprises: a light guide body 32 that outputs light introduced from at least one side edge surface 32A from a light emitting surface 32B that is one surface; a light source 34 inputting light from at least the one side edge surface 32A of the light guide body 32 to the inside thereof; and the optical sheet 10 according to the invention, which is disposed via for example an adhesive layer 31 on a light emitting surface 32B of the light guide body 32 and transmits light outputted from the light emitting surface 32B.

The light guide body 32 is a planar body made of a translucent material and is constituted such that light introduced from a side edge surface 32A on a left side in FIG. 4 is outputted from the light emitting surface 32B on an upper side. The light guide body 32 is formed of a translucent material similar to a material of the optical sheet 10 and is usually formed of an acryl or polycarbonate resin. A thickness of the light guide body 32 is usually about 1 to 10 mm, and the thickness thereof may be constant over an entire range or, as shown in FIG. 4, may have a taper shape where the thickness is largest at a position of a side edge surface 32A on a light source 34 side and becomes gradually thinner toward an opposite direction. The light guide body 32 is preferably imparted with a light scattering function inside or on a surface thereof to output light from a wide surface (light emitting surface 32B).

The light source 34 inputs light from at least one side edge surface 32A of the light guide body 32 to the inside thereof and is disposed along the side edge surface 32A of the light guide body 32. The light source 34 is not restricted to a linear light source such as shown in FIG. 4. That is, a point light source such as an incandescent lamp, an LED (light-emitting diode) may be disposed in line along a side edge surface 32A. Alternatively, a plurality of small planar fluorescent lamps may be disposed along a side edge surface 32A.

On the light emitting surface 32B of the light guide body 32, the optical sheet 10 according to the invention is disposed via, for example, an adhesive layer 31. The optical sheet 10 is disposed such that an opposite surface of the lens part 16 thereof may become a light emitting surface 32B of the light guide body 32.

A light reflective plate 36 is disposed on a surface on an opposite side from the light emitting surface 32B of the light guide body 32 and on a side edge surface other than the side edge surface 32A on a left side, and reflects light outputted from these surfaces and returns to the inside of the light guide body 32. As the light reflective plate 36, a thin metal plate on which aluminum or the like is deposited, a white foamed PET (polyethylene terephthalate) or the like is used.

Figure 5:
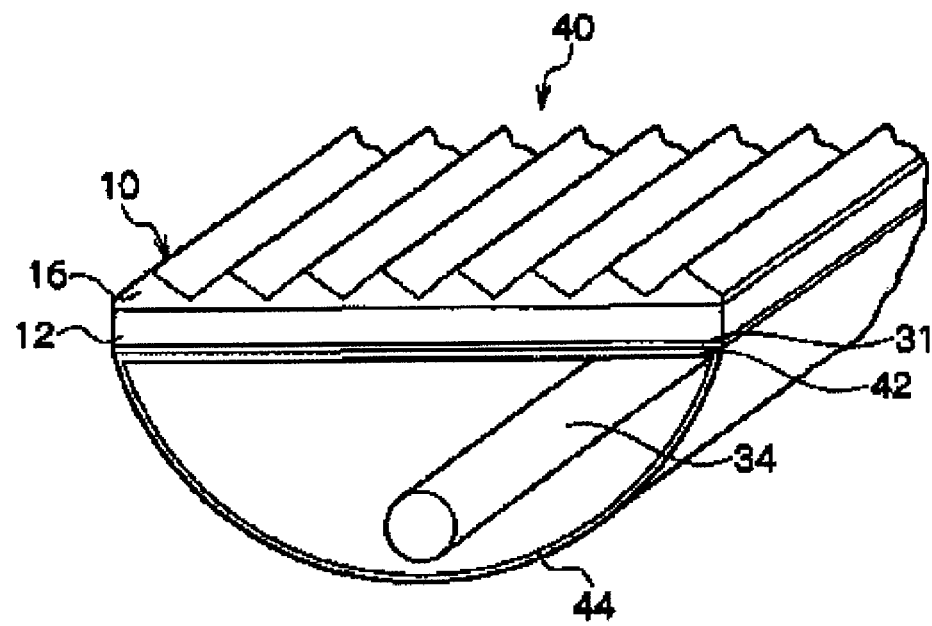
FIG. 5 is a perspective view showing one example of another surface light source device which comprises the optical sheet of the invention.

FIG. 5 is a perspective view showing one example of another surface light source device comprising an optical sheet of the invention. The surface light source device 40 is a direct type surface light source device and comprises the optical sheet 10 according to the invention, a light source 34 irradiating light from an opposite surface of a lens part 16 side of the optical sheet 10, and a concave-surfaced light reflective plate 44 disposed on an opposite side of the optical sheet seen from the light source 34 and reflecting light from the light source 34 in a direction of the optical sheet 10.

Light from the light source 34 is divided into one that goes toward a light emitting surface 42 on an optical sheet 10 side to transmits the optical sheet 10, and the other one that goes toward a light emitting surface 42 after reflected by the light reflective plate 44 to transmit the optical sheet 10.

As the light reflective plate 44, similarly to the surface light source device 30 shown in FIG. 4, a thin metal plate on which aluminum or the like is deposited, a white foamed PET (polyethylene terephthalate) or the like may be used. A shape of the light reflective plate 44 may homogeneously reflect light from the light source 34 as parallel light, and a shape such as a convex arc shape, a paraboloidal column shape, a hyperbolic column shape, or an elliptic column shape is selected.

Figure 6A:
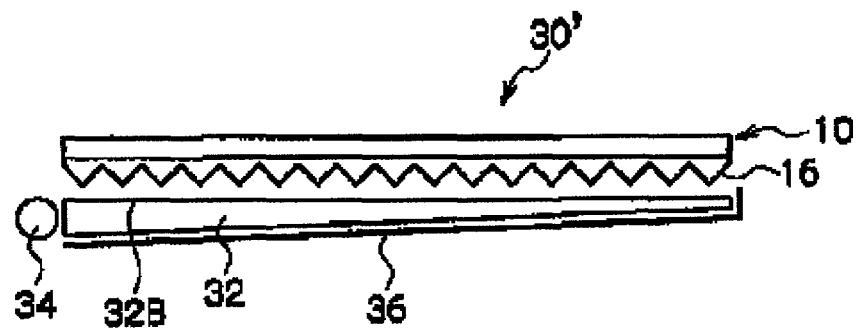
FIGS. 6A and 6B are each a perspective sectional view showing still another example of the surface light source device which comprises the optical sheet of the invention.
Figure 6B:
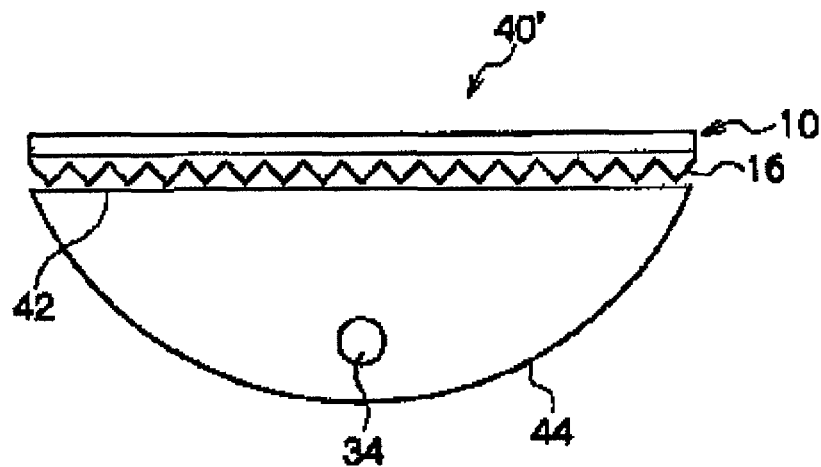

FIGS. 6A and 6B show perspective sectional views, and each of which shows a still another example of a surface light source device provided with the optical sheet of the invention. FIG. 6A shows an another example of an edge light type surface light source device shown in FIG. 4, and FIG. 6B shows another example of a direct type surface light source device shown in FIG. 5. A surface light source device 30' shown in FIG. 6A is different in a direction of a lens part 16 constituting an optical sheet 10 from the surface light source device 30 shown in the FIG. 4, and a lens part 16 thereof may be disposed on a side where light is outputted from the light source 34 to the optical sheet 10, that is, on a light emitting surface 32B side of the light guide body 32. Furthermore, a surface light source device 40' shown in FIG. 68 is different in a direction of a lens part 16 constituting the optical sheet 10 from the surface light source device 40 shown in the FIG. 5, and a lens part 16 constituting the optical sheet 10 may be disposed on a side where light is outputted from the light source 34 to the optical sheet 10, that is, on a light emitting surface 42 side on the optical sheet 10 side.

In such the surface light source devices, the optical sheet 10 of the invention shows an advantage that, also owning to the usage aspect thereof, pinnacles of unit prisms 14 disposed to the lens part 16 are not collapsed or cracked. Therefore, an optical sheet 10 that does not cause display irregularity such as white spots (white pattern) or the like on a display surface and may impart stable and excellent display performance may be provided. As the result, the optical sheet 10 is preferably used as an optical sheet constituting a surface light source device for, in particular, a recent high quality and large area liquid crystal display device.

(Display Device)

Figure 7:
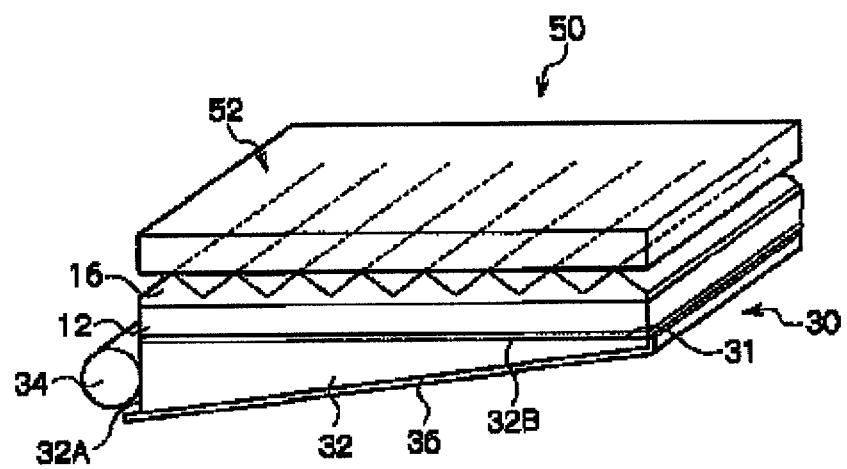
FIG. 7 is a perspective view schematically showing an example of a liquid crystal display device which comprises the surface light source device shown in FIG. 4.

FIG. 7 is a perspective view schematically showing one example of a liquid crystal display device that includes an edge light type surface light source device shown in FIG. 4. A liquid crystal display device 50 shown in FIG. 7 includes a liquid crystal panel 52 that is a planar translucent display body and an edge light type surface light source 30 disposed on a back surface of the liquid crystal panel 52 and irradiating the liquid crystal panel 52 with light from a back surface thereof. The liquid crystal display device 50 is a so-called back light type liquid crystal display device and is constituted such that light outputted from the surface light source device 30 may irradiate the respective pixels forming a liquid crystal screen from a back side. As the surface light source device, a surface light source device of an aspect shown in FIG. 5 or 6A-6B may be applied.

The liquid crystal display device 50 has the surface light source device 30 provided with the optical sheet according to the invention as a constituent member, whereby without generating display irregularity such as white spots (white pattern) on a display surface, stable and excellent display performance may be imparted.

The present invention is not restricted to the foregoing embodiments. The embodiments are provided only for the purpose of illustration, and all that has a substantially same configuration with a technical idea described in the scope of claims of the invention and exerts a similar advantage is contained in a technical range of the invention.

EXAMPLES

The present invention will be specifically described below with reference to examples. However, embodiments of the invention are not restricted to examples shown below.

1. Example 1-1

(1) Preparation of Sheet-like Optical Member

In a lens mold with a shape of unit prisms formed, a resin 1 having a composition shown below in Table 1-1 was dropped, followed by superposing a polyethylene terephthalate substrate (PET, trade name: A4300™, thickness: 125 µm, manufactured by Toyobo Co., Ltd.), further followed by pressure bonding an entire surface of PET on the resin 1 by use of a laminator. Then, at 780 mJ/cm², UV-rays were irradiated on the resin 1to cure a lens part having a number of unit prisms, whereby the lens part was integrated with the polyethylene terephthalate substrate. Thereafter, the lens mold was peeled off whereby a sheet-like optical member of the invention was obtained.

A shape of the unit prism was set to a triangular shape. In more detail, a shape, where a plurality of unit prisms each having an isosceles triangle shape with an apex angle of a unit prism of 80° was disposed at a pitch of 50 µm so that ridge lines thereof became in parallel with each other, was taken.

(2) Evaluation (Evaluation of Dynamic Viscoelasticity)

The resin 1 was coated on a PET film (LUMILART-60™) having a thickness of 125 µm so that a thickness of a coated film may be about 150 µm, followed by irradiating the resin 1 with UV-rays at about 780 mJ/cm². Thereafter, a coated film of the resin 1 was peeled from the PET film and this was used as a sample for evaluating dynamic viscoelasticity.

With such a sample, the dynamic viscoelasticity was evaluated. In the evaluation, by use of a dynamic viscoelastometer (type No. DMS6100, manufactured by SII NanoTechnology Inc.), glass transition temperature Tg (1), a maximum value of tan θ and equilibrium elastic modulus, which are measured under conditions of tensile sine wave, frequency of 1 Hz, strain amplitude of 0.05%, and temperature rise speed of 3° C./minute, were calculated.

(Evaluation of Elastic Modulus)

The resin 1 was coated on a 15 cm×15 cm glass substrate such that a thickness of a coated film became about 150 µm, followed by irradiating the resin 1 with UV-rays at about 780 mJ/cm². This was taken as a sample for evaluating ultrafine hardness.

The elastic deformation rate was evaluated of such the sample. In the evaluation, with MK320 as an indenter, an ultrafine hardness testing machine (unit name: FISCHER SCOPE H-100™, manufactured by Fischer Instruments K.K.) was used to evaluate properties of a coated film. An evaluation temperature range was set in the range of 30 to 60° C., an evaluation program was 300 mN (20 seconds)→creep 1 (60 seconds)→0.4 mN (4 seconds)→creep 2 (60 seconds) (144 seconds in total). Measurement conditions at this time were as follows.

Measurement unit: HU-100™ (manufactured by Fischer Instruments K.K.)

Analysis soft: WIN-HCU™ (manufactured by Fischer Instruments K.K.)

Elastic deformation rate: work volume of elastic deformation/total (work volume of elastic deformation+work volume of plastic deformation)

Creep deformation rate 1: creep deformation rate under maximum load of 300 mN

Creep deformation rate 2: creep deformation rate under minimum load of 0.4 mN

From results evaluated according to methods like this, at the respective temperatures, elastic deformation rates, creep deformation rates, creep deformation rates 2, maximum push-in depths (µm) and push-in depth (µm) after tests were calculated.

(Evaluation of Logarithmic Attenuation Rate)

The sheet-like optical member prepared according to the foregoing method was evaluated in a temperature range of 30° C. to 150° C. with a rigid body pendulum property tester (type No.: RPT-3000W™, manufactured by A & D Co., Ltd.). The maximum temperature of the obtained logarithmic attenuation rate was taken as Tg (2) and the logarithmic attenuation rate at that time was taken as ΔE.

(Evaluation of Pencil Hardness)

Pencil hardness of the lens part of the sheet-like optical member prepared according to the foregoing method was evaluated. In the evaluation, a pencil scratch hardness tester (type name: NB type, manufactured by Toyo Seiki Seisaku-sho, Ltd.) was used and a pencil hardness test was conducted so as to scratch unit prisms of the lens part in a vertical direction. At that time, the pencil hardness test was conducted with pencils from B to 4H. After the test, a shape of the unit prism was confirmed by observing a test portion with a microscope. The hardest pencil hardness where a shape was not maintained was taken as a result of the pencil hardness test. The pencil hardness test was conducted under a load of 500 g.

(Taper Test)

A sample having a prism shape was prepared into a disc having a predetermined magnitude and set on a taper tester (ABRASER Taber 530™, manufactured by Toyo Seiki Seisaku-sho, Ltd.). Thereafter, the sample was rotated 10 times with a load of 250 g added, followed by observing visually and with a microscope a state of a prism shape.

Results of foregoing evaluations are shown in Table 1-2.

2. Example 1-2

A sheet-like optical member was prepared in a manner similar to Example 1-1 except that a resin 2 having a composition shown below in Table 1-1 was used in place of the resin 1. Further, the resin 2 and a prepared sheet-like optical member were evaluated in a manner similar to Example 1-1.

Results thereof are shown below in Table 1-2.

3. Example 1-3

A sheet-like optical member was prepared in a manner similar to Example 1-1 except that a resin 3 having a composition shown below in Table 1-1 was used in place of the resin 1. Further, the resin 3 and a prepared sheet-like optical member were evaluated in a manner similar to Example 1-1.

Results thereof are shown below in Table 1-2.

TABLE 1-1

| Product name | Content | Structure | Manufacturer | Example 1 Resin 1 | Example 2 Resin 2 | Example 3 Resin 3 |
|---|---|---|---|---|---|---|
| UV-7000B ® | Oligomer | Urethane acrylate | Nippon Synthetic Chemical | 31.07 | 31.07 | 31.07 |

TABLE 1-1-continued

| Product name | Content | Structure | Manufacturer | Example 1 Resin 1 | Example 2 Resin 2 | Example 3 Resin 3 |
|---|---|---|---|---|---|---|
| | | | Industry Co., Ltd. | | | |
| Light acrylate PO-A ® | Monofunctional monomer | Phenoxyethyl acrylate | Kyoeisha Chemical Co., Ltd. | 2.91 | 2.91 | 2.91 |
| Light acrylate BP-4EA ® | Bifunctional monomer | Bisphenol A diacrylate (modified with 4 mole of EO) | Kyoeisha Chemical Co., Ltd. | | 4.86 | |
| Light acrylate BP-10EA ® | | Bisphenol A diacrylate (modified with 10 mole of EO) | Kyoeisha Chemical Co., Ltd. | 9.72 | 4.86 | 9.72 |
| Aronix M-220 ® | | Tripropylene glycol diacrylate | Toagosei Co., Ltd. | 19.41 | 19.41 | 19.41 |
| Aronix M-240 ® | | Tetraethylene glycol diacrylate | Toagosei Co., Ltd. | 9.71 | 9.71 | 9.71 |
| KAYARAD DPHA ® | Polyfunctional monomer | Dipentaerythritol hexaacrylate | Nippon Kayaku Co., Ltd. | 24.27 | 24.27 | 24.27 |
| IRGACURE 184 ® | Photoinitiator | 1-hydroxycyclohexyl phenyl ketone | Ciba Specialty Chemicals | 2.91 | 2.91 | 2.91 |
| | | | Total | 100 | 100 | 100 |

TABLE 1-2

| | Product name | Manufacturer | Structure | Comp. Example 1 Resin 4 | Com. Example 2 Resin 5 | Com. Example 3 Resin 6 |
|---|---|---|---|---|---|---|
| Epoxy acrylate | Epoxy ester 3000A ® | Kyoeisha Chemical Co., Ltd. | Bisphenol A epoxy acrylate | 35 | 20 | 35 |
| Urethane acrylate | Art resin IK-2 ® | Negami Chemical industrial Co., Ltd. | TDI/bis A/2-HEA (with PO-A reduced by 30%) | 12 | 22 | 12 |
| Mono functional monomer | Light acrylate PO-A ® | Kyoeisha Chemical Co., Ltd. | Phenoxyethyl acrylate | | 16 | 21 |
| | ACMO ® | Kohjin Co., Ltd. | Acryloyl morpholine | 44 | 13 | 23 |
| Bi functional monomer | Light acrylate BP-10EA ® | Kyoeisha Chemical Co., Ltd. | Bisphenol A diacrylate (modified with 10 mole of EO) | | 24 | |
| | Light acrylate DCP-A ® | Kyoeisha Chemical Co., Ltd. | Dicyclopentanyl acrylate | | | |
| Poly functional monomer | Aronix M-315 ® | Toagosei Co., Ltd. | Isocyanulic acid EO-modified triacrylate | | | 9 |
| | KAYARAD DPHA ® | Nippon Kayaku Co., Ltd. | Dipentaerythritol hexaacrylate | 9 | 5 | |
| | | | Minor Total | 100 | 100 | 100 |
| Photo initiator | IRGACURE 184 ® | Ciba Specialty Chemicals | 1-hydroxycyclohexyl phenyl ketone | 3 | 3 | 3 |
| | | | Total | 103 | 103 | 103 |

4. Comparative Example 1-1

A sheet-like optical member was prepared in a manner similar to Example 1-1 except that a resin 4 having a composition shown below in Table 1-3 was used in place of the resin 1. Further, the resin 4 and a prepared sheet-like optical member were evaluated in a manner similar to Example 1-1.

Results thereof are shown below in Table 1-4.

5. Comparative Example 1-2

A sheet-like optical member was prepared in a manner similar to Example 1-1 except that a resin 5 having a composition shown below in Table 1-3 was used in place of the resin 1. Further, the resin 5 and a prepared sheet-like optical member were evaluated in a manner similar to Example 1-1.

Results thereof are shown below in Table 1-4.

6. Comparative Example 1-3

A sheet-like optical member was prepared in a manner similar to Example 1-1 except that a resin 6 having a composition shown below in Table 1-3 was used in place of the resin 1. Further, the resin 6 and a prepared sheet-like optical member were evaluated in a manner similar to Example 1-1.

Results thereof are shown below in Table 1-4.

TABLE 1-3

| | | Refractive index | Tg (° C.) | Logarithmic attenuation rate | Maximum value of tanθ | Equilibrium elastic modulus (Pa) | Elastic deformation rate | | Creep deformation rate (1) | | Creep deformation rate (2) | | Pencil hardness test | Taper test |
|---|---|---|---|---|---|---|---|---|---|---|---|---|---|---|
| | | | | | | | 25° C. | 50° C. | 25° C. | 50° C. | 25° C. | 50° C. | | |
| Ex. 1 | Resin 1 | 1.51 | 113 | 0.17 | 0.17 | $3.80 \times 10^8$ | 42.3 | 40.3 | 12 | 18.3 | 54.6 | 65.8 | 4H | ○ |
| Ex. 2 | Resin 2 | 1.51 | 90 | 0.17 | 0.16 | $3.79 \times 10^8$ | 41.4 | 39.6 | 12.7 | 18 | 44.7 | 63 | 4H | ○ |
| Ex. 3 | Resin 3 | 1.52 | 115 | 0.36 | 0.14 | $4.22 \times 10^8$ | 41.7 | 38.5 | 12.4 | 17.4 | 43.7 | 57.6 | 4H | ○ |

TABLE 1-4

| | | Refractive index | Tg (° C.) | Logarithmic attenuation rate | Maximum value of tanθ | Equilibrium elastic modulus (Pa) | Elastic deformation rate | | Creep deformation rate (1) | | Creep deformation rate (2) | | Pencil hardness test | Taper test |
|---|---|---|---|---|---|---|---|---|---|---|---|---|---|---|
| | | | | | | | 25° C. | 50° C. | 25° C. | 50° C. | 25° C. | 50° C. | | |
| Com. Ex. 1 | Resin 4 | 1.56 | 140 | 0.46 | 0.7 | $4.2 \times 10^7$ | 39.8 | 35.6 | 8.8 | 14.1 | 23 | 25.4 | H | X |
| Com. Ex. 2 | Resin 5 | 1.56 | 68 | 0.56 | 0.73 | $4.2 \times 10^7$ | 35.6 | 20.8 | 11.5 | 44.7 | 28 | 44.7 | H | X |
| Com. Ex. 3 | Resin 6 | 1.56 | 110 | 0.81 | 0.85 | $3.5 \times 10^7$ | 38.6 | 34 | 9.9 | 14.7 | 22 | 27.4 | H | X |

7. Example 2-1

In a mold with a shaping mold of unit prisms 14 formed, a UV resin A shown in Table 2-1 was dropped, followed by superposing polyethylene terephthalate (PET, tradename: A4300™, thickness: 125 μm, manufactured by Toyobo Co., Ltd.), further followed by pressing an entire surface of PET against the UV resin A by use of a laminator. Then, UV-rays were irradiated at 780 mJ/cm² to cure a lens part 16 having a number of unit prisms 14 and to integrate with the PET, followed by peeling off the mold, thereby an optical sheet of Example 2-1 was obtained. At this time, a unit prism 14 was formed into a triangular shape, in more detail, a shape where a cross section of a unit prism had an isosceles triangle shape having an apex angle of 80°, and the unit prisms were disposed side by side at a pitch of 50 μm so that ridge lines thereof became in parallel with each other. A test sample of 5 cm×5 cm was cut out of the obtained optical sheet and supplied to measure overall transmittance.

The UV resin A that is a resin composition for an optical sheet was obtained by weighing and mixing materials shown in Table 2-1, followed by heating at 60° C., further followed by stirring until homogeneity was obtained, viscosity thereof being 1350 (mPa·s/23° C.). The refractive index of a cured material of the UV resin A was 1.562.

Of the obtained optical sheets, results of overall transmittances before and after application of a load and variation rates thereof, results of Tg of a lens part measured with a rigid body pendulum, results of Tg of a lens part measured by a dynamic viscoelastic measurement, and results of equilibrium elastic modulus (160° C., 1 Hz) of a lens part measured by a dynamic viscoelastic measurement are shown in Table 2-2. Results of pencil hardness, results of appearance visual observations, and results of total evaluation are also shown in Table 2-2.

8. Example 2-2

An optical sheet of Example 2-2 was prepared in a manner similar to Example 2-1 except that, a UV resin B shown in Table 2-1 was used in place of the UV resin A used in Example 2-1. At this time, the viscosity of the UV resin B was 1700 (mPa·s/23° C.) and the refractive index of a cured material of the UV-resin B was 1.557. The obtained optical sheet was subjected to tests in a manner similar to Example 2-1, and results thereof are shown in Table 2-2.

9. Example 2-3

An optical sheet of Example 2-3 was prepared in a manner similar to Example 2-1 except that, a UV resin C shown in Table 2-1 was used in place of the UV resin A used in Example 2-1. At this time, the viscosity of the UV resin C was 1380 (mPa·s/23° C.) and the refractive index of a cured material of the UV-resin C was 1.559. The obtained optical sheet was subjected to tests in a manner similar to Example 2-1 and results thereof are shown in Table 2-2.

10. Example 2-4

An optical sheet of Example 2-4 was prepared in a manner similar to Example 2-1 except that, a UV resin D shown in Table 2-1 was used in place of the UV resin A used in Example 2-1. At this time, the viscosity of the UV resin D was 1960 (mPa·s/23° C.) and the refractive index of a cured material of the UV-resin D was 1.556. The obtained optical sheet was subjected to tests in a manner similar to Example 2-1 and results thereof are shown in Table 2-2.

11. Example 2-5

An optical sheet was prepared in a manner similar to Example 2-1 and evaluated in a manner similar to Example 2-1 except that a temperature when a load was applied to a lens part 16 was set at 25° C. (40° C. in Examples 2-1 to 2-4 and Comparative Examples 2-1 to 2-3) when evaluating the obtained optical sheet.

12. Example 2-6

An optical sheet of Example 2-6 was prepared in a manner similar to Example 2-1 except that, a UV resin E of which manufacturer was unknown was used in place of the UV resin A used in Example 2-1. A composition of the UV resin E was unknown and could not be described in Table 2-1. However, the viscosity thereof was 1570 (mPa·s/23° C.) and the refractive index of a cured material of the UV-resin E was 1.560. The obtained optical sheet was subjected to tests similar to Example 2-1 and results thereof are shown in Table 2-2.

13. Comparative Example 2-1

An optical sheet of Comparative Example 2-1 was prepared in a manner similar to Example 2-1 except that, a UV resin F shown in Table 2-1 was used in place of the UV resin A used in Example 2-1. At this time, the viscosity of the UV resin F was 2400 (mPa·s/23° C.) and the refractive index of a cured material of the UV-resin F was 1.560. The obtained optical sheet was subjected to tests similar to Example 2-1 and results thereof are shown in Table 2-2.

14. Comparative Example 2-2

An optical sheet of Comparative Example 2-2 was prepared in a manner similar to Example 2-1 except that, a UV resin G of which manufacturer was unknown was used in place of the UV resin A used in Example 2-1. A composition of the UV resin G was unknown and could not be described in Table 2-1. However, the viscosity thereof was 1750 (mPa·s/23° C.) and the refractive index of a cured material of the UV-resin G was 1.563. The obtained optical sheet was subjected to tests similar to Example 2-1 and results thereof are shown in Table 2-2.

15. Comparative Example 2-3

An optical sheet of Comparative Example 2-3 was prepared in a manner similar to Example 2-1 except that, a UV resin H of which manufacturer was unknown was used in place of the UV resin A used in Example 2-1. A composition of the UV resin H was unknown and could not be described in Table 2-1. However, the viscosity thereof was 1160 (mPa·s/23° C.) and the refractive index of a cured material of the UV-resin H was 1.562. The obtained optical sheet was subjected to tests similar to Example 2-1 and results thereof are shown in Table 2-2.

TABLE 2-1

| | Product name | Exs. 1, 5 UV Resin A | Ex. 2 UV Resin B | Ex. 3 UV Resin C | Ex. 4 UV Resin D | Ex. 6 UV Resin E | Com. Ex. 1 UV Resin F | Com. Ex. 2 UV Resin G | Com. Ex. 3 UV Resin H |
|---|---|---|---|---|---|---|---|---|---|
| Epoxy acrylate | Epoxy ester 3000A ® | 35 | 35 | 35 | 35 | — | 20 | — | — |
| Urethane acrylate | Art resin IK-2 ® | 12 | 12 | 12 | 12 | — | 22 | — | — |
| Monofunctional monomer | Light Acrylate PO-A ® | 21 | — | 16 | 11 | — | 16 | — | — |
| | AOMO ® | 23 | 44 | 23 | 23 | — | 13 | — | — |
| Bifunctional monomer | Light Acrylate BP-10EA ® | — | — | — | — | — | 24 | — | — |
| | Light Acrylate DCP-A ® | — | — | 10 | 10 | — | — | — | — |
| Polyfunctional monomer | Aronix M-315 ® | 9 | — | — | — | — | — | — | — |
| | KAYARAD DPHA ® | — | 9 | 4 | 9 | — | 5 | — | — |
| Photoinitiator | IRGACURE 184 ® | 3 | 3 | 3 | 3 | — | 3 | — | — |
| | Total (parts by weight) | 103 | 103 | 103 | 103 | — | 103 | — | — |

TABLE 2-2

| | Overall transmittance (%) (before application of load) | Overall transmittance (%) (after application of load) | Variation rate (%) | Tg(1) (° C.) | Tg(2) (° C.) | Equilibrium elastic modulus (160° C., 1 HZ, E') × $10^7$ | Pencil hardness | Appearance | Overall evaluation |
|---|---|---|---|---|---|---|---|---|---|
| Example 1 | 12.4 | 15.7 | 3.3 | 110 | 109.4 | 3.9 | 2H | ○ | B |
| Example 2 | 12.3 | 12.9 | 0.6 | 145 | 145.6 | 4.2 | 3H | ○ | A |
| Example 3 | 13.1 | 14.4 | 1.3 | 120 | 117.1 | 4.9 | 3H | ○ | A |
| Example 4 | 13.3 | 13.7 | 0.4 | 130 | 131.7 | 8.5 | 3H | ○ | A |
| Example 5 | 14.1 | 15.4 | 1.3 | 110 | 109.4 | 3.9 | 2H | ○ | A |
| Example 6 | 12.8 | 20.9 | 8.1 | 85 | 88.0 | 9.3 | H | ○-Δ | C |
| Com. Ex. 1 | 12.4 | 33.2 | 20.8 | 70 | 69.9 | 4.2 | H | X | D |
| Com. Ex. 2 | 12.3 | 44.5 | 32.2 | 50 | 50.0 | 5.6 | HB | X | E |
| Com. Ex. 3 | 12.7 | 54.3 | 41.6 | 60 | 60.0 | 3.2 | HB | X | E |

Tg (1) is a glass transition temperature Tg measured with use of a rigid body pendulum, and
Tg (2) is a glass transition temperature Tg measured by use of a dynamic viscoelastometer.

In Table 2-1, "Epoxy ester 3000A®" (manufactured by Kyoeisha Chemical Co., Ltd.) is epoxy acrylate having a bisphenol A epoxy acrylate structure; "Art resin IK-2®" (manufactured by Negami Chemical industrial co., ltd.) is a phenoxyethyl acrylate 30% reduced product of urethane acrylate obtained by reacting trilenediisocyanate, bisphenol A tetrapropoxydiol, and 2-hydroxyethyl acrylate, "Light Acrylate PO-A®" (manufactured by Kyoeisha Chemical Co., Ltd.) is a monofunctional monomer having a phenoxyethyl acrylate structure; "ACMO®" (manufactured by Kohjin Co., Ltd.) is a monofunctional monomer having an acryloyl morpholine structure; "Light Acrylate BP-10EA®" (manufactured by Kyoeisha Chemical Co., Ltd.) is a bifunctional monomer having a bisphenol A diacrylate (modified with 10 mole of ethylene oxide) structure; "Light Acrylate DCP-A®" (manufactured by Kyoeisha Chemical Co., Ltd.) is a bifunctional monomer having a dicyclopentanyl acrylate structure; "Aronix M-315®" (manufactured by Toagosei Co., Ltd.) is a polyfunctional monomer having an isocyanuric acid ethylene oxide-modified triacrylate structure; "KAYARAD DPHA®" (manufactured by Nippon Kayaku Co., Ltd.) is a polyfunctional monomer having a dipentaerythritol hexaacrylate structure; and "IRUGACURE 184®" (manufactured by Ciba Specialty Chemicals Co., Ltd.) is a photoinitiator having a 1-hydroxycyclohexylphenyl ketone structure.

(Measurement and Evaluation)

(1) Overall transmittance: Overall transmittance of the obtained optical sheet was measured according to a method based on JIS K 7361-1 and JIS K 7105 with a haze meter (NDH 2000™, manufactured by Nippon Denshoku Industries Co., Ltd.). In the beginning, 5 pieces of prepared measurement sample of 5 cm×5 cm were placed with a prism surface of a lens part directed upward, thereafter, with a constant load compression tester (manufactured by Toyo Seiki Seisaku-sho, Ltd.), under an environment of 40° C., a load of 26 kg/cm² (weight: stainless steel having a diameter of 2.5 mm and weight of 1.276 kg) was applied for 24 hours to the prism surface to conduct "collapse test of pinnacles". Of each of Examples 2-1 to 2-6 and Comparative Examples 2-1 to 2-3, the overall transmittance was measured as shown below. That is, the overall transmittance was measured of each of measurement samples before and after a load is applied in such a manner that light is irradiated from a back surface of a measurement sample (namely, a surface on a side where unit prisms are not formed), followed by measuring transmitted light. An Example 2-5 was measured at a temperature of 25° C. (Examples 2-1 to 2-4, and 2-6 and Comparative Examples 2-1 to 2-3 were measured at 40° C.). The results thereof are shown in Table 2-1 and the differences (%) of the overall transmittances before and after a load is applied are shown together.

(2) Glass transition temperature Tg: In Table 2-1, Tg (1) is a glass transition temperature Tg measured with a rigid body pendulum properties tester (type No.: RPT-3000W, manufactured by A & D Co., Ltd.) under conditions of 25° C./40% humidity, and Tg (2) is a glass transition temperature Tg measured with a dynamic viscoelastometer (type No.: DMS6100, manufactured by SII NanoTechnology Inc.) under condition of tensile sine wave, frequency of 1 Hz, strain amplitude of 0.05%, and temperature-rise speed of 3° C./minute. Results are shown in Table 2-1.

(3) Equilibrium elastic modulus: The equilibrium elastic modulus is a value of storage elastic modulus (E') measured at 160° C. with a dynamic viscoelastometer (type No.: DMS6100, manufactured by SII NanoTechnology Inc.) under condition of tensile sine wave, frequency of 1 Hz, strain amplitude of 0.05%, and temperature-rise speed of 3° C./minute. Results are shown in Table 2-1.

(4) Pencil hardness: The pencil hardness was measured based on JIS K5600-5-4 with a pencil scratch hardness tester (type No.: NP, manufactured by Toyo Seiki Seisaku-sho Co., Ltd.) from 4B to 4H, and hardness where scratch started to develop was visually observed and was taken as the pencil hardness. Results are shown in Table 2-1.

(5) Appearance measurement: Appearance of the obtained optical sheet was visually observed. The mark "○" in Table 2-2 shows a case where, even after application of a load, an appearance same as that before application of a load was shown, the mark "Δ" in Table 2-2 shows a case where, after application of a load, an appearance changed to a whitish state and slight collapse of pinnacles was observed with a microscope, and the mark "X" in Table 2-2 shows a case where after application of a load, an appearance of conspicuous white spots or white patterns was shown. Results are shown in Table 2-1.

(6) Overall evaluation: The overall evaluation was conducted based on the foregoing evaluation results. However, the appearance evaluation and pencil hardness were taken as main viewpoints. The evaluation "A" shows an optical sheet having no problem, the evaluation "B" shows an optical sheet sufficiently capable of turning out as a product level, the evaluation "C" shows an optical sheet that is, though poorer than "B", capable of turning out as a product level, and the evaluations "D" and "E" show an optical sheet incapable of turning out as a product level. Results are shown in Table 2-1.

(Result)

From results of Table 2-2, optical sheets of Examples 2-1 to 2-6 according to the invention did not cause a problem of collapse of pinnacles. However, optical sheets of Comparative Examples 2-1 to 2-3 caused a problem of the collapse of pinnacles. Furthermore, in Example 2-6 and Comparative Examples 2-2 and 2-3, optical sheets were prepared with a UV resin of which manufacturer is not unknown. According to the result, in the case where a resin composition appropriate as an optical sheet is selected, by use of an evaluation method where difference of overall transmittances before and after application of a load or appearance is evaluated, distinguished advantages that a resin composition for an optical sheet that does not generate a problem of the collapse of pinnacles may be very readily adopted or selected or a developed resin composition may be readily evaluated are obtained, that is, the evaluation method is industrially meaningful as well as an evaluation method of a resin composition for an optical sheet.

The invention claimed is:

1. A sheet-like optical member comprising: a substrate; and a lens part, which is formed on the substrate, is made of an active energy ray-curable resin, and has a plurality of unit prisms,
   wherein a maximum logarithmic attenuation rate ΔE of the lens pail measured by a rigid body pendulum method is 0.4 or less.

2. The sheet-like optical member according to claim 1, wherein a maximum temperature of a logarithmic attenuation rate of the lens part measured by a rigid body pendulum method is 60° C. or more.

3. The sheet-like optical member according to claim 1, wherein a refractive index of the lens part is 1.5 or more.

4. A sheet-like optical member comprising: a substrate; and a lens part, which is formed on the substrate, is made of an active energy ray-curable resin, and has a plurality of unit prisms, wherein a tangent of loss elastic modulus and storage elastic modulus (tan θ=loss elastic modulus/storage elastic modulus) of the active energy ray-curable resin is 0.2 or less in a temperature range from 0° C. to 200° C.

5. The sheet-like optical member according to claim 4, wherein an equilibrium elastic modulus (160° C., 1 Hz) of the active energy ray-curable resin is $1.0 \times 10^8$ Pa or more.

6. The sheet-like optical member according to claim 4, wherein a refractive index of the lens part is 1.5 or more.

7. An optical sheet comprising: a transparent substrate; and a lens part, which is made of a number of unit prisms, formed from an active energy ray-curable resin composition, and formed on the transparent substrate, wherein, in the lens part, a difference between an overall transmittance after a load of 26 kg/cm² is applied to a pinnacle of the unit prism for 24 hours under an environment of 40° C. and an overall transmittance before the load is applied is 10% or less.

8. The optical sheet according to claim 7, wherein: Tg of the lens part measured with a rigid body pendulum is 80° C. or more and 160° C. or less, Tg (1 Hz) of the lens part measured by a dynamic viscoelastic measurement is 80° C. or more and 160° C. or less, and an equilibrium elastic modulus (160° C., 1 Hz) of the lens part measured by a dynamic viscoelastic measurement is $3 \times 10^7$ Pa or more and $1 \times 10^8$ Pa or less.

9. The optical sheet according to claim 7, wherein a refractive index of the lens part is 1.555 or more and 1.600 or less.

10. A resin composition for an optical sheet for forming a lens part made of a number of unit prisms provided to an optical sheet, wherein a cured material of the resin composition has a difference of 10% or less between an overall transmittance after a load of 26 kg/cm² is applied for 24 hours under an environment of 40° C. and an overall transmittance before the load is applied.

11. The resin composition for an optical sheet according to claim 10, wherein a refractive index of the cured resin composition is 1.555 or more and 1.600 or less.

12. The resin composition for an optical sheet according to claim 10, wherein the resin composition comprises: bisphenol A epoxy(meth)acrylate; urethane (meth)acrylate which is a reaction product of tolylenediisocyanate and/or xylylene diisocyanate, a diol compound represented by a formula (1), and OH-containing (meth)acrylate represented by a formula (2); one kind or two or more kinds of monofunctional monomer selected from a phenoxyethyl (meth)acrylate derivative represented by a formula (3), acryloylmorpholine, isobornyl (meth)acrylate, and benzyl (meth)acrylate; one kind or two or more kinds of polyfunctional monomer selected from an isocyanulate (meth)acrylate derivative represented by a formula (4), dipentaerythritol hexa(meth)acrylate, trimethylolpropane tri(meth)acrylate, glycerin tri(meth)acrylate, and pentaerythritol tri(meth)acrylate; and a photoinitiator,

[Chemical Formula 1]

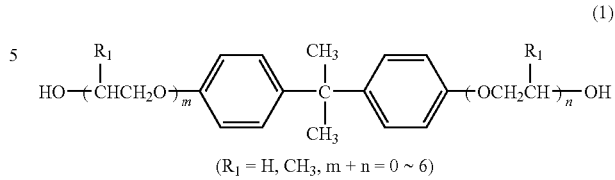

($R_1$ = H, $CH_3$, m + n = 0 ~ 6)

[Chemical Formula 2]

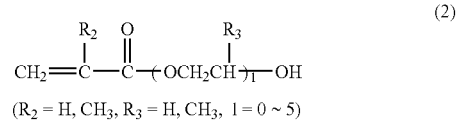

($R_2$ = H, $CH_3$, $R_3$ = H, $CH_3$, l = 0 ~ 5)

[Chemical Formula 3]

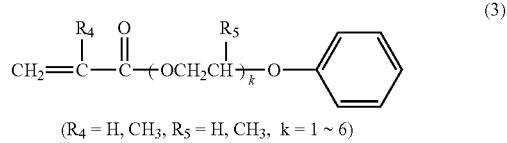

($R_4$ = H, $CH_3$, $R_5$ = H, $CH_3$, k = 1 ~ 6)

[Chemical Formula 4]

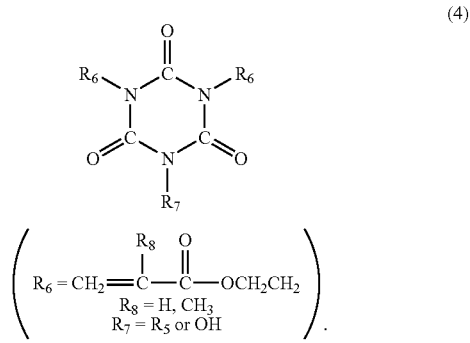

13. A method for producing an optical sheet having a lens part which has a number of unit prisms on a transparent substrate, comprising at least a step for: forming a lens part wherein an active energy ray is irradiated after the resin composition for an optical sheet according to claim 10 is coated on a shaping mold to form the lens part.

14. The method for producing an optical sheet according to claim 13, wherein the lens part formed by the step for forming a lens part has: Tg measured with a rigid body pendulum in the range of 80° C. or more and 160° C. or less, Tg (1 Hz) measured by a dynamic viscoelastic measurement in the range of 80° C. or more and 160° C. or less, and an equilibrium elastic modulus (160° C., 1 Hz) measured by a dynamic viscoelastic measurement in the range of $3 \times 10^7$ Pa or more and $1 \times 10^8$ Pa or less.

\* \* \* \* \*